US012259078B2

(12) United States Patent
Pedersen et al.

(10) Patent No.: US 12,259,078 B2
(45) Date of Patent: Mar. 25, 2025

(54) LOCKING CAP FOR FIRE DEPARTMENT CONNECTIONS

(71) Applicant: KNOX Associates, Inc., Phoenix, AZ (US)

(72) Inventors: Jason S. Pedersen, Phoenix, AZ (US); Tab S. Hinton, Phoenix, AZ (US); Nathan M. Becktold, Phoenix, AZ (US); Bryan E. Pavlovic, Cave Creek, AZ (US)

(73) Assignee: KNOX Associates, Inc., Phoenix, AZ (US)

( * ) Notice: Subject to any disclaimer, the term of this patent is extended or adjusted under 35 U.S.C. 154(b) by 0 days.

(21) Appl. No.: 18/381,533

(22) Filed: Oct. 18, 2023

(65) Prior Publication Data

US 2024/0247748 A1    Jul. 25, 2024

Related U.S. Application Data

(63) Continuation of application No. 17/165,550, filed on Feb. 2, 2021, now Pat. No. 11,821,565.

(60) Provisional application No. 63/003,483, filed on Apr. 1, 2020, provisional application No. 62/969,269, filed on Feb. 3, 2020.

(51) Int. Cl.
| *F16L 55/115* | (2006.01) |
| *B65D 59/02* | (2006.01) |
| *B65D 59/06* | (2006.01) |
| *F16L 57/00* | (2006.01) |

(52) U.S. Cl.
CPC ............ *F16L 55/115* (2013.01); *B65D 59/02* (2013.01); *B65D 59/06* (2013.01); *F16L 57/005* (2013.01)

(58) Field of Classification Search
CPC .... F16L 55/115; F16L 55/1152; F16L 57/005; B65D 59/06; B65D 59/02
See application file for complete search history.

(56) References Cited

U.S. PATENT DOCUMENTS

| 468,781 A | 2/1892 | Brentano |
| 703,016 A | 6/1902 | Tash |
| 737,667 A | 9/1903 | Schunck |
| 1,161,158 A | 11/1915 | Rennert |
| 1,164,197 A | 12/1915 | Kildear |
| 1,349,610 A | 8/1920 | Gibney |
| 1,362,647 A | 12/1920 | Stone et al. |
| 1,604,874 A | 10/1926 | Bertschinger |

(Continued)

FOREIGN PATENT DOCUMENTS

| EP | 2455647 A2 | 5/2012 |
| FR | 2498726 A1 | 7/1982 |

(Continued)

OTHER PUBLICATIONS

Office Action issued in Canadian application No. 3,107,913 on Mar. 31, 2023.

*Primary Examiner* — Zachary T Dragicevich
*Assistant Examiner* — James A Linford
(74) *Attorney, Agent, or Firm* — Knobbe, Martens, Olson & Bear, LLP

(57) ABSTRACT

A locking cap may be selectively locked into place within a tubular opening, such as the open end of a standpipe used to charge a building sprinkler system. The locking cap may have a plug portion. A friction load can be used to limit removal of the plug portion.

19 Claims, 24 Drawing Sheets

(56) References Cited

U.S. PATENT DOCUMENTS

| | | | |
|---|---|---|---|
| 1,892,904 A | 1/1933 | Robinson et al. | |
| 2,218,581 A | 10/1940 | Levan | |
| 2,283,371 A | 5/1942 | Johnson | |
| 2,315,102 A | 3/1943 | Adams | |
| 2,463,138 A | 3/1949 | Bamberg | |
| 2,565,669 A | 8/1951 | Smith | |
| 2,629,395 A | 2/1953 | Krone et al. | |
| 2,667,139 A | 1/1954 | Walter | |
| 2,684,860 A | 7/1954 | Rafferty | |
| 2,777,353 A | 1/1957 | Willis | |
| 2,886,067 A * | 5/1959 | Maxwell | G01M 3/022 138/90 |
| D192,653 S | 4/1962 | Madeira | |
| 3,136,148 A | 6/1964 | Nehls | |
| D206,455 S | 12/1966 | Thompson | |
| 3,361,460 A | 1/1968 | Jansen | |
| 3,456,463 A | 7/1969 | Mihalich | |
| 3,603,132 A | 9/1971 | Holmes | |
| 3,613,936 A * | 10/1971 | Kaiser | F16L 55/132 220/237 |
| 3,695,139 A | 10/1972 | Howe | |
| 3,738,691 A | 6/1973 | Firth | |
| 3,855,882 A | 12/1974 | Wittmann | |
| 3,901,167 A | 8/1975 | Reese | |
| 3,914,966 A | 10/1975 | Bello | |
| 3,915,335 A | 10/1975 | Shanklin et al. | |
| 4,000,633 A | 1/1977 | Evans | |
| 4,022,536 A | 5/1977 | Piepho et al. | |
| 4,100,629 A | 7/1978 | Jones et al. | |
| 4,140,413 A | 2/1979 | Conrad | |
| 4,141,574 A | 2/1979 | Stansifer et al. | |
| 4,143,530 A | 3/1979 | Murtezov et al. | |
| 4,172,606 A | 10/1979 | Howe | |
| 4,182,361 A | 1/1980 | Oakey | |
| 4,184,516 A | 1/1980 | Oesterritter et al. | |
| 4,299,102 A | 11/1981 | Aro | |
| 4,303,101 A | 12/1981 | Tholen | |
| 4,351,446 A | 9/1982 | Madden | |
| 4,384,812 A | 5/1983 | Miyagawa | |
| 4,402,531 A | 9/1983 | Kennedy, Jr. | |
| 4,436,219 A | 3/1984 | Reutter | |
| 4,480,513 A | 11/1984 | McCauley et al. | |
| 4,526,193 A | 7/1985 | Drach | |
| 4,527,407 A | 7/1985 | Shanklin | |
| 4,566,481 A | 1/1986 | Leopold, Jr. et al. | |
| 4,602,654 A | 7/1986 | Stehling et al. | |
| 4,633,896 A | 1/1987 | Bainbridge et al. | |
| 4,651,771 A | 3/1987 | Borenstein et al. | |
| 4,674,306 A | 6/1987 | Halpern | |
| 4,742,702 A | 5/1988 | Swertz | |
| 4,794,768 A | 1/1989 | Moser et al. | |
| 4,905,547 A | 3/1990 | Nigrelli | |
| 5,033,501 A | 7/1991 | Stehling | |
| 5,037,260 A | 8/1991 | Rubin | |
| 5,072,750 A | 12/1991 | Poms et al. | |
| 5,148,727 A | 9/1992 | Williamson | |
| 5,219,254 A | 6/1993 | Ball et al. | |
| 5,295,831 A | 3/1994 | Patterson et al. | |
| 5,381,919 A | 1/1995 | Griffin et al. | |
| 5,383,495 A | 1/1995 | Kennedy | |
| 5,390,573 A | 2/1995 | Mann | |
| 5,419,650 A | 5/1995 | Hoshino | |
| 5,437,309 A | 8/1995 | Timmons | |
| 5,462,381 A | 10/1995 | DeWatcher et al. | |
| 5,520,300 A | 5/1996 | Griffin | |
| 5,549,133 A | 8/1996 | Sigelakis | |
| 5,588,460 A | 12/1996 | Meneses | |
| 5,632,301 A | 5/1997 | Julicher | |
| 5,667,093 A | 9/1997 | Lefevre | |
| D387,657 S | 12/1997 | Holmes | |
| 5,704,261 A | 1/1998 | Strauch et al. | |
| 5,797,659 A | 8/1998 | Fuller | |
| 5,803,110 A | 9/1998 | Segal | |
| D400,769 S | 11/1998 | Duke | |
| 5,863,166 A | 1/1999 | Young | |
| 5,868,047 A | 2/1999 | Faust et al. | |
| 5,904,057 A | 5/1999 | Abney, III et al. | |
| 5,947,318 A | 9/1999 | Palm | |
| D415,676 S | 10/1999 | Negishi et al. | |
| 5,970,552 A | 10/1999 | Kwlecian et al. | |
| 6,003,558 A | 12/1999 | Neto et al. | |
| 6,017,177 A | 1/2000 | Lanham | |
| 6,029,709 A | 2/2000 | Burgess | |
| 6,044,670 A | 4/2000 | Citurs et al. | |
| 6,070,442 A | 6/2000 | Neeley et al. | |
| 6,089,253 A | 7/2000 | Stehling et al. | |
| 6,102,444 A | 8/2000 | Kozey | |
| 6,112,761 A | 9/2000 | Scotto | |
| RE36,959 E | 11/2000 | Griffin | |
| 6,199,414 B1 | 3/2001 | Chang | |
| D440,838 S | 4/2001 | Trempala | |
| 6,213,331 B1 | 4/2001 | Morgan et al. | |
| D448,982 S | 10/2001 | Trempala | |
| 6,340,933 B1 | 1/2002 | Chen et al. | |
| 6,487,882 B2 | 12/2002 | Trempala | |
| D472,434 S | 4/2003 | Trempala | |
| 6,550,294 B2 | 4/2003 | Garguilo | |
| 6,553,795 B1 | 4/2003 | Trempala | |
| 6,571,588 B1 | 6/2003 | Yuen | |
| 6,694,783 B2 | 2/2004 | Trempala | |
| 6,698,261 B2 | 3/2004 | Trempala | |
| 6,712,544 B2 | 3/2004 | Kruger et al. | |
| 6,802,338 B1 | 10/2004 | Istre, Jr. | |
| 6,907,760 B2 | 6/2005 | Trempala | |
| 6,908,271 B2 | 6/2005 | Breslin et al. | |
| 6,910,355 B2 | 6/2005 | Swanson | |
| 7,140,212 B2 | 11/2006 | Trempala | |
| 7,437,901 B2 | 10/2008 | Trempala | |
| 8,683,831 B2 | 4/2014 | Trempala | |
| 8,991,434 B2 | 3/2015 | Trempala | |
| 9,341,299 B2 | 5/2016 | Trempala | |
| 2003/0121297 A1 | 7/2003 | Trempala | |
| 2004/0148985 A1 | 8/2004 | Swanson | |
| 2004/0154361 A1 | 8/2004 | Trempala et al. | |
| 2005/0017865 A1 | 1/2005 | Belden | |
| 2005/0155659 A1 | 7/2005 | Rahimzadeh et al. | |
| 2010/0140924 A1 | 6/2010 | Trempala | |
| 2017/0198741 A1 | 7/2017 | Marc | |
| 2021/0396339 A1 | 12/2021 | Pedersen et al. | |

FOREIGN PATENT DOCUMENTS

| | | |
|---|---|---|
| FR | 2903163 A1 | 1/2008 |
| GB | 271379 A | 5/1927 |
| KR | 10-1486939 B1 | 1/2015 |

* cited by examiner

LOCKING CAP FOR FIRE DEPARTMENT CONNECTIONS

RELATED APPLICATIONS

This application is a continuation of U.S. application Ser. No. 17/165,550, which was filed on Feb. 2, 2021 and is titled "LOCKING CAP FOR FIRE DEPARTMENT CONNECTIONS, the disclosure of which is expressly incorporated by reference herein in its entirety for all purposes, and which claims priority to U.S. Provisional Application No. 62/969,269, which was filed on Feb. 3, 2020 and is titled "LOCKING CAP FOR FIRE DEPARTMENT CONNECTIONS," the disclosure of which is expressly incorporated by reference herein in its entirety for all purposes. Further, U.S. application Ser. No. 17/165,550 claims priority to U.S. Provisional Application No. 63/003,483, which was filed on Apr. 1, 2020 and is titled "LOCKING CAP FOR FIRE DEPARTMENT CONNECTIONS," the disclosure of which is expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57.

BACKGROUND OF THE INVENTION

Field of the Invention

The present invention generally relates to a locking cap for open ends of plumbing components and, more specifically, to a protective locking cap for threaded openings in couplings, fixtures and the like. Even more specifically, the present invention relates to a locking cap for fire retardant sprinkler systems utilizing charging pipes.

Description of the Related Art

In automatic fire protection sprinkler systems, the standing water supply may not be sufficient to maintain optimum operating water pressure when several sprinkler heads are in simultaneous operation. Accordingly, the National Fire Protection Association Code requires a connection through which a fire department can pump water into the sprinkler system in order to charge or recharge the sprinkler system. Where such connections are provided, upon arrival of fire department personnel, an auxiliary water supply, usually a hose supplied with water from a fire truck pump, is connected to a union connection located outside the building. Such hose connections often are termed siamese connections and are fitted with union nuts that have an internal thread sized configured to match the external thread of the hose of the local fire department. Also, in most instances, the union nut is loosely retained on the inlet pipe through a bearing arrangement and is provided with radially extending parts that are adapted to be operated by a "spanner" wrench carried by most firefighters.

The National Fire Protection Association Code also specifies that such hose connections shall be equipped with plugs or caps. Because the hose connections may be in unsecured public locations, the plugs or caps help to reduce the likelihood that passersby, vandals, or arsonists will damage the connections and render the connections inoperable. For example, the plugs or caps cover the auxiliary water inlet to the sprinkler system to prevent malicious introduction of trash or other debris. Such trash and debris might clog the sprinkler system when it may be needed most.

Several types of caps or plugs have been provided to cover the union nut of siamese connections and to protect the integrity and operability of the sprinkler system. One such arrangement includes an easily breakable cap, made of cast iron for example, which cap is attached to the union nut by U-bolts carried by the cap but adapted to engage the posts of the union nut to hold the cap in place. Such cap members have been particularly vulnerable to vandalism and are particularly susceptible to breakage at the points where the U-bolts are received in the cap. Furthermore, while the cap may be not broken through vandalism, certain portions of the cap rust through over time and the caps simply fall off. Because of the differences in coefficients of thermal expansion between the union nut and the cap, the cap also is susceptible to breakage when subjected to temperature extremes.

Another common device is a brass plug that has external threads. The external threads are received in the union nut. The plug, like the union nut, may be provided with radially extending posts to be operated by a spanner wrench. The union nut of such a siamese connections usually is brass so it is desired to provide brass plugs. The brass plugs, however, have substantial scrap value. Accordingly, because of their location in often unsecured public places, the plugs frequently may be stolen for resale as scrap.

SUMMARY OF THE INVENTION

The systems, methods and devices described herein have innovative aspects, no single one of which is indispensable or solely responsible for their desirable attributes. Without limiting the scope of the claims, some of the advantageous features will now be summarized.

In some configurations, a locking cap for a pipe end comprises a plug portion having a front surface, a rear surface, and a central region extending between the front surface and the rear surface. The plug portion may be sized and configured to be received by the pipe end with the side surface of the plug portion having a surface area generally coextensive with an inner contacted surface of the pipe end. A threaded region disposed on the central region can be configured to mate with the pipe end. A flange can be disposed on the front surface. The flange may have a radial edge. A tool receiver can be disposed in the front surface of the plug portion.

In some such configurations, a tool receiver may be recessed into the front surface of the plug portion. In some such configurations, the radial edge may be 0.015 inches or smaller. In some such configurations, the tool receiver may be disposed on the head of a bolt and the bolt extends from the front surface to the rear surface. In some such configurations, the tool receiver may be selectively engageable with a key head portion. In some such configurations, the plug portion, the tool receiver, the bolt and a nut threaded onto the bolt may be a unitary component. In some such configurations, the plug portion may be formed of brass. In some such configurations, the unitary component may be formed of brass.

In some configurations, a locking cap for a pipe end comprises a faceplate with a front surface and a rear surface. A plug portion may have a second front surface, a second rear surface, and a central region extending between the second front surface and the second rear surface. The plug portion can be sized and configured to be received by the pipe end with the side surface of the plug portion having a surface area generally coextensive with an inner contacted surface of the pipe end. A threaded region can be disposed on the central region. The threaded region can be configured to mate with the pipe end. At least one dowel pin receiver can be disposed on the rear surface of the faceplate and at least one dowel pin receiver can be disposed on the front surface of the plug portion. A bolt may be configured to traverse a first hole in the faceplate and a threaded second hole in the plug portion. The first hole and the second hole may be aligned. The at least one dowel pin receiver on the faceplate and the at least one dowel pin receiver on the plug portion may be aligned and traversed by a dowel pin. The plug portion can be positioned adjacent to the face plate with the rear surface of the face plate arranged to substantially face the front surface of the plug portion. A distance between the rear surface of the faceplate and the front surface of the plug portion may be adjustable by adjusting the bolt.

In some such configurations, the rear surface of the faceplate may have a protrusion that mates with a corresponding recess in the front surface of the plug portion. In some such configurations, two or more dowel pin receivers may be disposed on the rear surface of the faceplate and on the front surface of the plug portion. In some such configurations, the tool receiver may be recessed into the front surface. In some such configurations, the front surface of the faceplate may have a flange with a radial edge disposed thereon. In some such configurations, the radial edge may be 0.015 inches or smaller. In some such configurations, the tool receiver may be disposed on a head of a bolt and the bolt extends from the front surface to the rear surface. In some such configurations, the tool receiver may be selectively engageable with a key head portion. In some such configurations, the plug portion, the tool receiver, and the bolt may be a unitary component. In some such configurations, the faceplate forms a unitary piece with a dowel pin inserted into the at least one dowel pin receiver on the faceplate. In some such configurations, the plug portion may be formed of brass. In some such configurations, the unitary component may be formed of brass.

In some configurations, the locking cap comprises a faceplate with a front surface and a rear surface. A swivel guard has a front surface and a rear surface. A plug portion has a second front surface, a second rear surface, and a central region extending between the second front surface and the second rear surface. The plug portion can be sized and configured to be received by a pipe end with the side surface of the plug portion having a surface area generally coextensive with an inner contacted surface of the pipe end. A threaded region can be disposed on the central region. The threaded region can be configured to mate with the pipe end. At least one dowel pin receiver is disposed on the rear surface of the faceplate. At least one dowel pin receiver is disposed on the front surface of the plug portion. A bolt is configured to traverse a first hole in the faceplate, a third hole in the swivel guard, and a threaded second hole in the plug portion. The first hole, the third hole and the second hole are aligned. The at least one dowel pin receiver on the faceplate and the at least one dowel pin receiver on the plug portion are aligned and traversed by a respective dowel pin. The swivel guard is positioned between the face plate and the plug portion. A distance between the rear surface of the faceplate and the front surface of the plug portion may be adjustable by adjusting the bolt.

In some such configurations, the rear surface of the faceplate may have a protrusion that mates with a corresponding recess in the front surface of the plug portion. In some such configurations, two or more dowel pin receivers may be disposed on each of the rear surface of the faceplate and the front surface of the plug portion. In some such configurations, the tool receiver may be recessed into the front surface. In some such configurations, the front surface of the faceplate may have a flange with a radial edge disposed thereon. In some such configurations, the radial edge may be 0.015 inches or smaller. In some such configurations, the tool receiver is disposed on a head of a bolt and the bolt extends from the front surface to the rear surface. In some such configurations, the tool receiver may be selectively engageable with a key head portion. In some such configurations, the plug portion, the tool receiver, and the bolt may be a unitary component. In some such configurations, the faceplate forms a unitary piece with a dowel pin inserted into the at least one dowel pin receiver on the faceplate. In some such configurations, the plug portion is formed of brass. In some such configurations, the unitary component is formed of brass. In some such configurations, the swivel guard has a notch configured to receive a lug.

In some configurations, a locking cap comprises a plug portion having a front surface, a rear surface, and a central region extending between the front surface and the rear surface. The plug portion is sized and configured to be received by a pipe end with the side surface of the plug portion having a surface area generally coextensive with an inner contacted surface of the pipe end. A threaded region is disposed on the central region. The threaded region is configured to mate with the pipe end. A flange on the front surface has a radial edge. A tool receiver is disposed on the front surface. A swivel guard, with two notches configured to accommodate lugs of a pipe end, is rotatably fastened to the front surface of the plug portion.

In some such configurations, a cover retains a bolt and the cover may be coupled to the swivel guard. In some such configurations, the tool receiver is recessed into the front surface. In some such configurations, the radial edge is 0.015 inches or smaller. In some such configurations, the tool receiver is disposed on a head of a bolt and the bolt extends from the front surface to the rear surface. In some such configurations, the tool receiver may be selectively engageable with a key head portion. In some such configurations, the plug portion, the tool receiver, the bolt and a nut threaded onto the bolt may be a unitary component. In some such configurations, the plug portion is formed of brass. In some such configurations, the unitary component is formed of brass.

In some configurations, a locking cap comprises a first swivel guard that has a front surface, a rear surface and a first notch configured to accommodate a pipe lug. A second swivel guard has a front surface, a rear surface and a second notch configured to accommodate a pipe lug. The first notch and the second notch are configured to coordinate to retain the pipe lug. The first swivel guard and the second swivel guard are configured to lock together in a locked position. In the locked position, movement of the pipe lug retained by the first notch and second notch is constrained relative to the first swivel guard and the second swivel guard. In the locked position, the rear surface of the first swivel guard may be arranged to substantially face the front surface of the second swivel guide.

In some such configurations, there are two or more notches on each swivel guard. In some such configurations, when locked, translation of the first swivel guard relative to the second swivel guard may be substantially zero. In some such configurations, a bolt is retained by a cover with the cover retaining the first and second swivel guards. In some such configurations, at least one of the first swivel guard and the second swivel guard is formed of brass. In some such configurations, the locking cap comprises a face plate that has a front surface and a rear surface. A plug portion has a front surface, a rear surface and a side surface. The plug portion is sized and configured to be received by the pipe end with the side surface of the plug portion having a surface area generally coextensive with an inner contacted surface of the pipe end. The plug portion is connected to the face plate with the rear surface of the face plate arranged to face the front surface of the plug portion. A slot in the plug portion extends longitudinally between the front surface and the rear surface and a relief opening is defined within the plug portion. A recess is defined through the plug portion along the slot. The recess receives a cam that rotates. At least one surface contacting the cam has at least one detent for the cam. Wherein the cam and the at least one surface contacting the cam cooperate to expand and retract the plug portion.

In some such configurations, two pins may be disposed on the front surface. In some such configurations, the plug portion is formed of brass. In some such configurations, the cam is actuated by an actuator. In some such configurations, the actuator has a tool receiver that is configured to be operated by a specially configured tool. In some such configurations, the tool receiver is recessed into the face plate.

In some configurations, a locking cap for a fire department connection comprises a body and a cover. The body comprises a cylindrical threaded outer circumferential portion. The body also comprising a stopping lip that extends radially outward relative to the cylindrical threaded outer circumferential portion. The stopping lip being configured to contact a forward end of a swivel of the fire department connection. The cover being rotatable relative to the body. The cover extending radially outward farther than the body. The cover also extending rearward beyond the stopping lip. The body comprising a unique patterned driver receptacle. The unique patterned driver receptacle being fixed for rotation with the body.

In some such configurations, the locking cap further comprises a fastener and the unique patterned driver receptacle is formed on a head of the fastener. In some such configurations, the cover comprises a recess and the fastener extends though the recess. In some such configurations, the recess comprises a conical portion and the fastener comprises a complementary conical portion. In some such configurations, the body comprises a threaded bore and the fastener is received in the threaded bore. In some such configurations, the fastener is secured relative to the body using a nut. In some such configurations, the nut is a nylock nut.

In some configurations, a locking cap for a pipe end comprises a plug portion with a front surface, a rear surface, and a central region extending between the front surface and the rear surface. The plug portion is sized and configured to be received by the pipe end with a side surface of the plug portion having a surface area generally coextensive with an inner contacted surface of the pipe end. A threaded region is disposed on the central region configured to mate with the pipe end. A flange is provided on the front surface. The flange may have a radial edge. A tool receiver is disposed on the front surface. A swivel guard, with two notches configured to accommodate lugs of a pipe end, is rotatably fastened to the front surface of the plug portion. A wave washer is sized to be retained between the flange and the threaded region.

In some such configurations, a cover retains a bolt and the cover may be coupled to the swivel guard. In some such configurations, the tool receiver may be recessed into the front surface. In some such configurations, the radial edge may be 0.015 inches or smaller. In some such configurations, the tool receiver may be disposed on a head of a bolt and the bolt extends from the front surface to the rear surface. In some such configurations, the tool receiver may be selectively engageable with a key head portion. In some such configurations, the plug portion, tool receiver, bolt and a nut threaded onto the bolt may be a unitary component. In some such configurations, the plug portion may be formed of brass. In some such configurations, the unitary component may be formed of brass. In some such configurations, the wave washer has a preload of about 56-96 lbs.

In some configurations, a locking cap for a fire department connection comprises a body, a cover, and a waver washer. The body comprises a cylindrical threaded outer circumferential portion. The body also comprises a stopping lip that extends radially outward relative to the cylindrical threaded outer circumferential portion. The wave washer is sized to be retained between the stopping lip and the cylindrical threaded outer circumferential portion. The stopping lip is configured to contact the wave washer. The wave washer is configured to contact a forward end of a swivel of the fire department connection. The cover is rotatable relative to the body. The cover extends radially outward further than the body. The cover also extends rearward beyond the stopping lip. The body comprises a unique patterned driver receptacle. The unique patterned driver receptacle is fixed for rotation with the body.

In some such configurations, the cap comprises a fastener. The unique patterned driver receptacle is formed on a head of the fastener. In some such configurations, the cover comprises a recess and the fastener extends though the recess. In some such configurations, the recess comprises a conical portion and the fastener comprises a complementary conical portion. In some such configurations, the body comprises a threaded bore and the fastener is received in the threaded bore. In some such configurations, the fastener is secured relative to the body using a nut. In some such configurations, the nut is a nylock nut. In some such configurations, the recess comprises a stepped portion and the fastener comprises a complementary stepped portion. In some such configurations, the body and the fastener are a unitary component. In some such configurations, the wave washer has a preload of about 56-96 lbs.

BRIEF DESCRIPTION OF THE DRAWINGS

These and other features, aspects, and advantages of certain illustrative but non-limiting embodiments of the present invention will be described with reference to the following drawings.

DETAILED DESCRIPTION OF THE PREFERRED EMBODIMENTS

Figure 1:
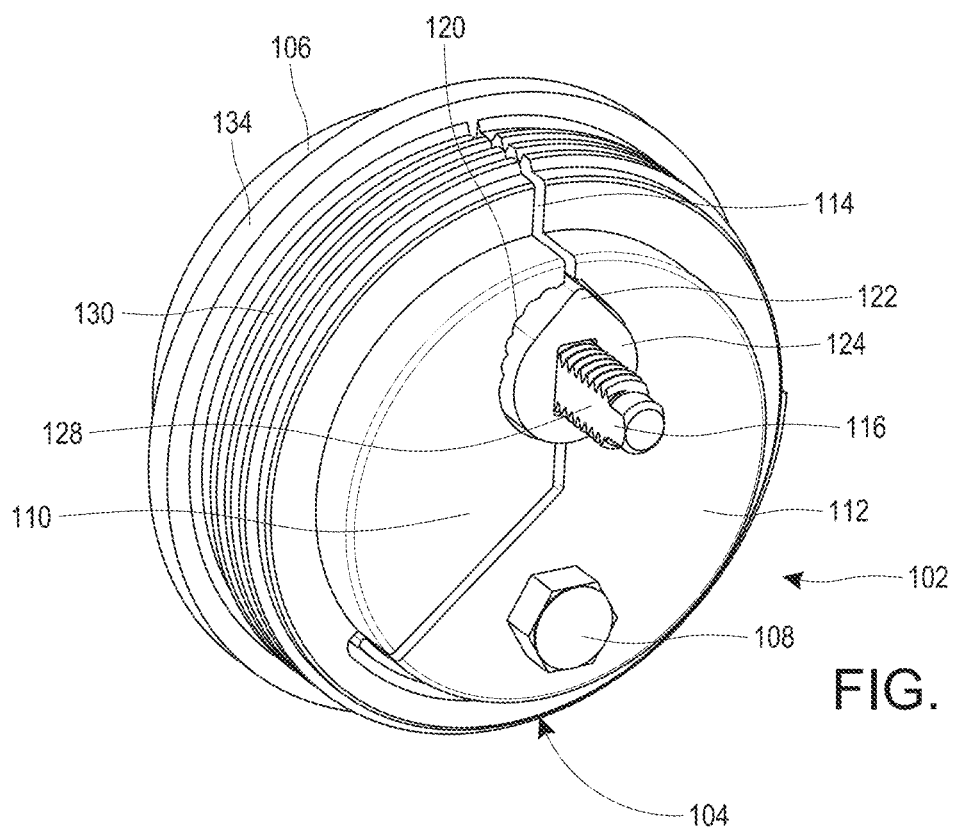
FIG. 1 is a rear perspective view of a first exemplary locking cap embodiment that is arranged and configured in accordance with certain features, aspects, and advantages of the present invention.
Figure 2:
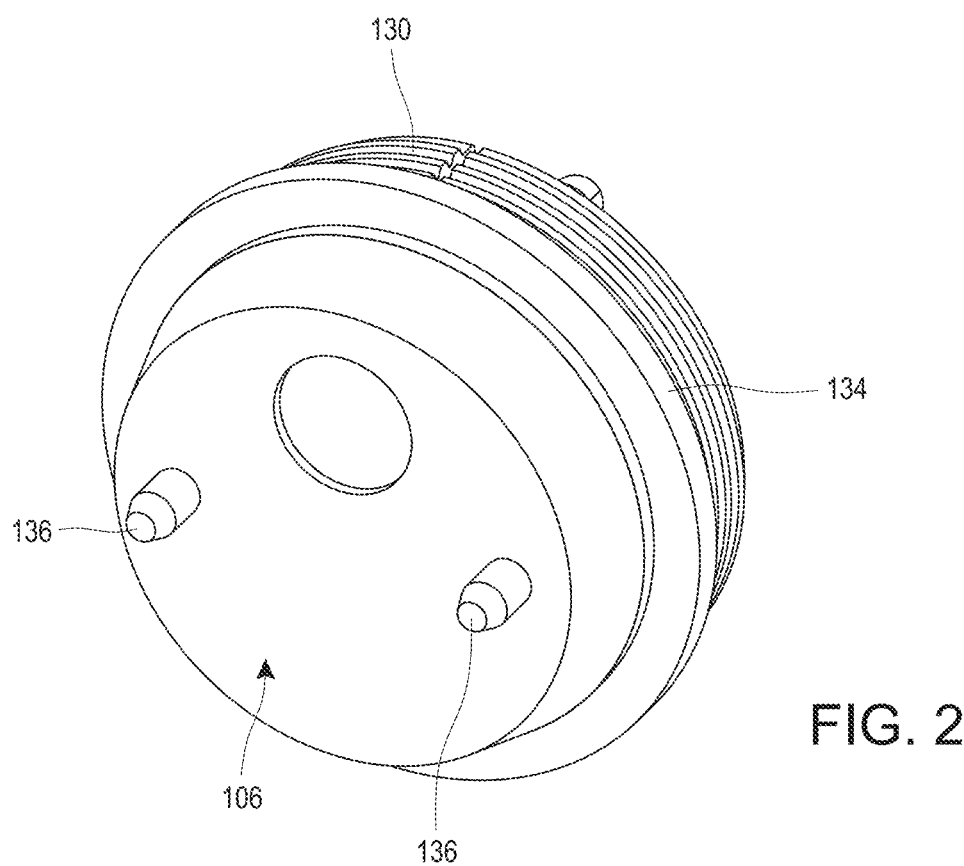
FIG. 2 is front perspective view of the locking cap of FIG. 1.
Figure 3:
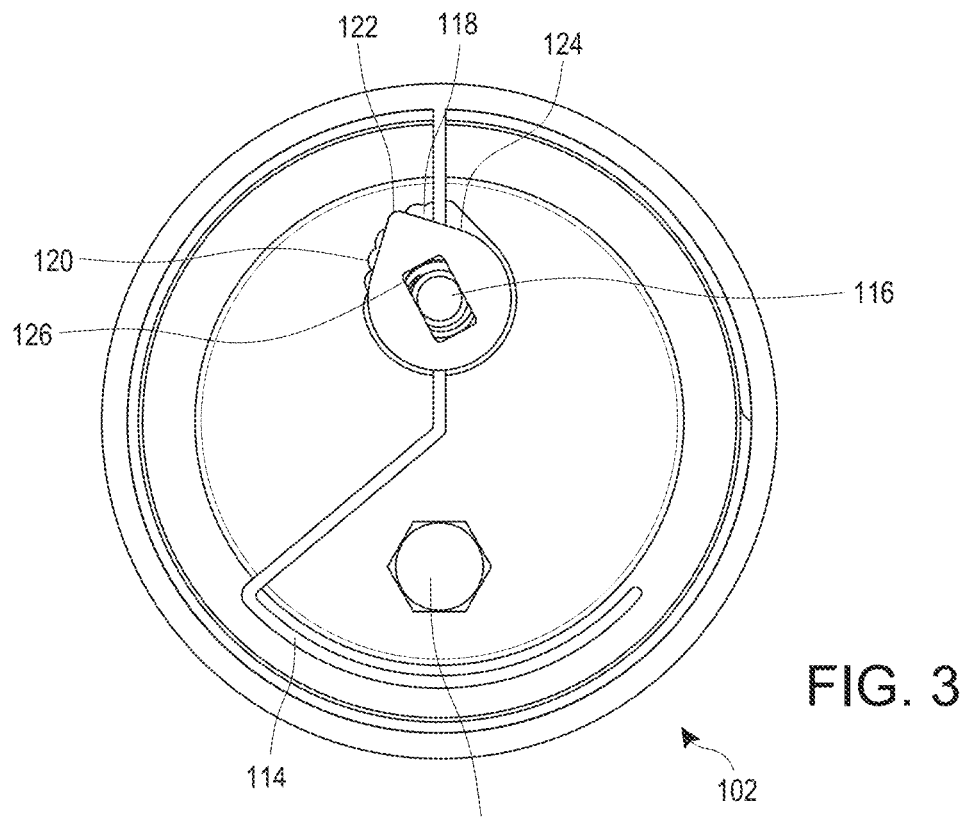
FIG. 3 is a rear view of the locking cap of FIG. 1.

With reference to FIGS. 1-3, a first locking cap embodiment 102 will be described. The locking cap embodiment 102 preferably is configured for insertion into a fire department connection. In the illustrated configuration, the locking cap embodiment 102 can be inserted into an open fire department connection and threaded into a swivel of the fire department connection. When the locking cap embodiment 102 has been inserted into the fire department connection, the lock cap embodiment 102 can be expanded such that a frictional force between the locking cap embodiment 102 and the fire department connection increases. The increased frictional force resists removal of the locking cap embodiment 102.

With reference to FIG. 1, the illustrated locking cap embodiment 102 generally comprises a plug portion 104 and a front cover portion 106. The front cover portion 106 can be joined to the plug portion 104 in any suitable manner. In the illustrated configuration, the front cover portion 106 can comprise a threaded blind hole (not shown) while the plug portion 104 comprises a hole through which a threaded fastener 108 extends. The threaded fastener 108 secures the front cover portion 106 to the plug portion 104. Because the threaded fastener 108 is positioned with a head portion abutting at least a portion of the plug portion 104, the threaded fastener 108 is protected from access when the locking cap embodiment 102 is installed within the fire department connection.

The plug portion 104 is split into a first portion 110 and a second portion 112. A slot 114 defines a boundary between the first portion 110 and the second portion 112. The slot extends fully through the thickness of the plug portion 104. At least one of the first portion 110 and the second portion 112 is movable relative to the other. In some configurations, the first portion 110 is movable relative to the second portion 112. The illustrated slot 114 extends vertically downward from a top of the plug portion. The slot 114 intersects an opening (not shown) through which a cam driver 116 extends. The slot 114 then extends at an angle downwardly and then has a generally arcuate portion. The generally arcuate portion provides some degree of stress relief and facilitates the spreading apart of the first portion 110 and the second portion 112.

As shown in FIG. 3, a cam-receiving recess 118 is positioned along the portion of the slot 114 that is intersected by the opening for the cam driver 116. The cam-receiving recess 118 can have any suitable configuration. In the illustrated configuration, the cam-receiving recess 118 comprises a plurality of scallops that define a plurality of detents 120. Each of the scallops has an apex or top. A distance between the apex of each scallop and the center of rotation of the cam driver 116 decreases from scallop to scallop in the direction of locking rotation of the cam driver 116. In the illustrated configuration, the scallops define a sweep of about one quarter turn such that the cam driver 116 can pivot about ninety degrees from stop to stop. In some configurations, the cam-receiving recess 118 can be replaced by a plateau that does not fully surround the cam driver 116 or by another structure that provides the detents. In some configurations, the pivoting of the cam driver 116 can be more than ninety degrees. In some configurations, the pivoting of the cam driver 116 can be less than ninety degrees.

The detents 120 interact with a tip 122 of a cam 124. In the illustrated configuration, the cam 124 has a lobed configuration such that the tip 122 projects further away from the axis about which it pivots compared to a body of the cam 124. As the angular position of the cam 124 changes, the tip 122 moves between adjacent detents 120. The cam 124 drives the first portion 110 of the plug portion 104 such that the plug portion 104 expands as the first portion 110 hinges away from the second portion 112. Each detent 120 from the clockwise-most detent to the counter-clockwise most detent has a decreasing distance from the axis about which the cam 124 rotates when viewed in any set position. The decrease in distance helps to urge the first portion 110 away from the second portion 112. In some configurations, the cam 124 may have other shapes, such as an ellipse shape, an eccentric shape, an egg shape, a hexagonal shape, a snail shape, or any other suitable shape for its intended purpose. In these configurations, the detents 120 may be shaped to coordinate with the cam 124 to enable the desired degree of expansion of the plug portion 104.

The cam 124 in the illustrated configuration comprises a square or rectangular bore 126. The bore 126 can have any suitable shape. In some configurations, the bore 126 can be circular with a single flat wall. Thus, the bore 126 can have one or more walls that deviate the bore 126 from a cylindrical shape. The bore 126 receives a portion of the cam driver 116. In the illustrated configuration, the bore 126 receives an end portion of the cam driver 116. At least the portion of the cam driver 116 received by the bore 126 has a complementary shape to the bore 126 such that rotation of the cam driver 116 results in rotation of the cam 124. In the illustrated configuration, the cam driver 116 incorporates at least one flat surface 128. On the end disposed to the front (i.e., the end adjacent to the front cover portion), the cam driver 116 may have a specialized geometry. The specialized geometry may be configured to match a specialized tool such that ordinary tools that can be obtained at the hardware store cannot be used effectively to turn the cam driver 116 (although turning the cam driver 116 with such a hardware store bought tool may be possible). Examples of such geometry may be found in other embodiments described herein and such descriptions apply equally to this embodiment.

As shown in FIG. 1, the plug portion 104 can be provided with a threaded outer surface 130. The threaded outer surface is sized and configured to thread into a swivel of a fire department connection. Accordingly, in use, the plug portion 104 can be threaded into the swivel prior to being locked into position using the interaction of the cam 124 and the detents 120 of the cam-receiving recess 118.

The front cover portion 106 may have a flange 134 configured to abut against the swivel when the cam lock cap 102 has been fully threaded into the swivel. The flange 134 may have a cylindrical outer edge as well as planar flat front and back surfaces. A front surface of the front cover portion 106 may be substantially flat. Two pins 136 may be secured in any suitable manner relative to the front surface. Each of the pins 136 may be substantially cylindrical with rounded or tapered distal points. In some configurations, the pins 136 are received within a tool that facilitates removal if the friction between the cam lock cap 102 and the swivel is too significant to allow turning by hand. In such cases, the tool may be engaged with the face pins 136 and the entire assembly may be rotated out of the swivel either using the tool or by hand without the tool.

In use, the threaded outer surface 130 can be engaged with a threaded inner surface of a swivel. The cam lock cap 102 then can be tightened into the swivel until the flange 134 is seated against a surface of the swivel. With the flange seated against the surface of the swivel, the cam lock cap 102 can be locked into position using the cam 124 and detents 120. By turning the cam driver 116, which may require the specially configured mating tool, the cam 124 pivots. As the cam 124 pivots, the cam tip 122 moves from detent to detent until the cam 124 reaches the locked position. The pivoting of the cam 124 and the interaction of the cam tip 122 with the detents 120 drives the first portion 110 of the plug portion 104 away from the second portion 112, which effectively spreads at least a portion of the slot 114. The expansion or spreading of the slot 114 effectively enlarges the outer perimeter of the plug portion 104. When assembled to the swivel, this enlargement may increase a force between the interior surface of a swivel and the threaded outer surface 130 of the plug portion 104, which increases the friction between the threaded outer surface 130 of the plug portion 104 and the threaded inner surface of the swivel. As a result, when the cam 124 pivots to the locked position, the cam lock cap 102 may be difficult to remove from the swivel. The increased frictional load between the threads resist loosening rotation of the cam lock cap 102 relative to the swivel.

To remove the locked cam lock cap 102 from the swivel, the cap 102 first is unlocked by pivoting the cam 124 through the series of detents 120. Rotating the cam 124 out of the detents 120 allows the slot 114 to close, which allows the plug portion 104 to return to a resting dimension. The resting dimension of the plug portion 104 does not result in a significant radially outward force being exerted between the cam lock cap 102 and the swivel and so the frictional load resisting rotation of the plug portion 104 and the swivel may be relatively low. The cam lock cap 102 then can be removed from the swivel by relative rotation between the swivel and the cam lock cap 102.

Figure 4:
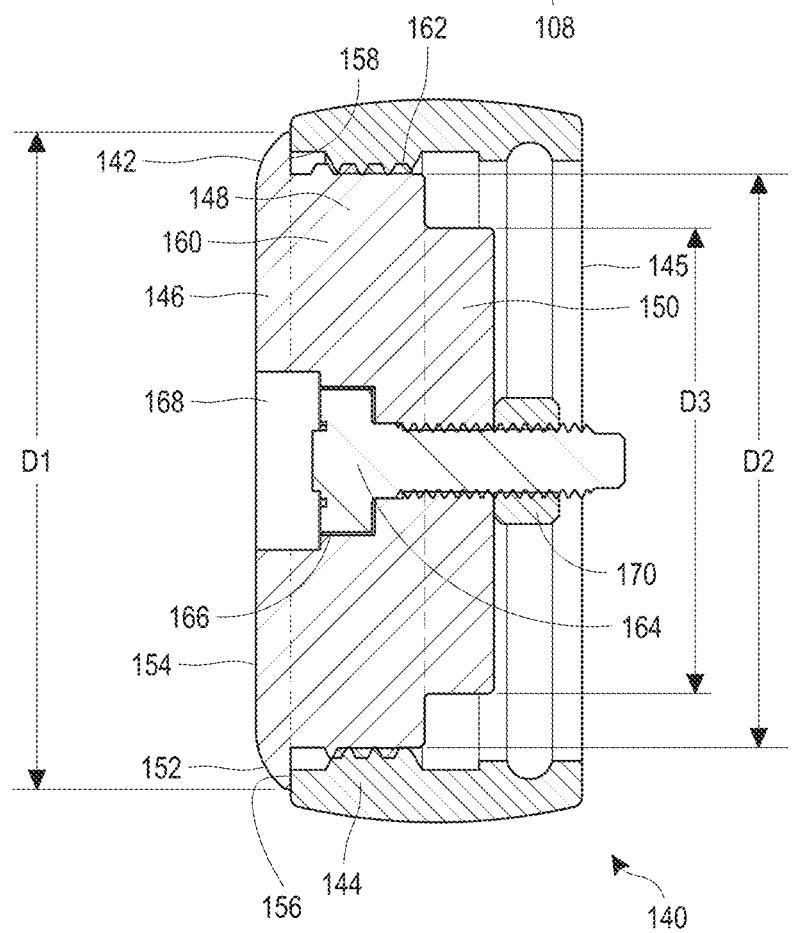
FIG. 4 is a sectioned side view of a second exemplary locking cap embodiment that is arranged and configured in accordance with certain features, aspects, and advantages of the present invention.
Figure 5:
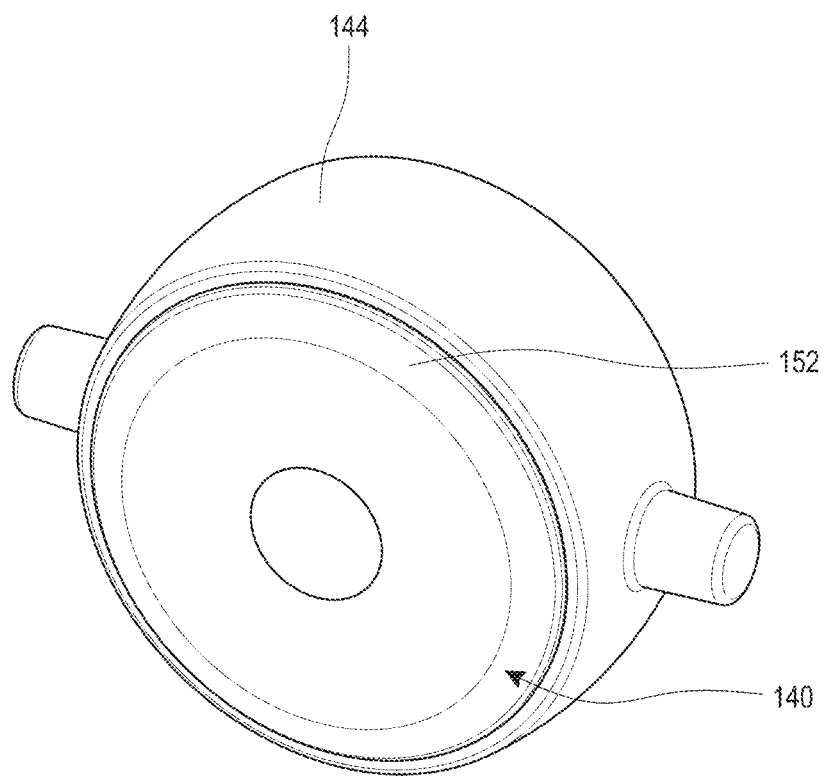
FIG. 5 is a front perspective view of the locking cap of FIG. 4 shown installed in a swivel of a fire department connection.

FIGS. 4 and 5 illustrate a one-piece cap embodiment 140 that is arranged and configured in accordance with certain features, aspects, and advantages of certain embodiments of the present invention.

With reference to FIG. 4, the illustrated cap 140 comprises a monolithic plug 142. The plug 142 can be formed from a single piece of material. Forming the plug 142 from a single piece of material reduces production labor and can produce a less expensive component compared to forming the plug 142 from a plurality of components that then are assembled and secured together. As will be described below, the plug 142 can be sized and configured to be inserted into the swivel 144 of the fire department connection.

The plug 142 comprises at least two different outer dimensions. In the illustrated configuration, the plug 142 comprises at least three different outer dimensions. In some configurations, the plug 142 comprises at least three different diameters. With reference to FIG. 4, the illustrated plug 142 comprises a frontal portion 146, an intermediate threaded portion 148, and a rear portion 150. In some configurations, the intermediate threaded portion 148 and the rear portion 150 can be merged into a single portion. In some configurations, the rear portion 150 can be omitted.

The frontal portion 146 generally comprises a planar front surface 154. The illustrated front surface 154 is circular in shape. An outer edge 152 of the front surface 154 comprises a radius. The radius is preferably 0.020 inch or less. To achieve the benefits of the radiused surface the radius may be 0.075 inch or less. The largest diameter D1 defined by the frontal portion 146 preferably is larger than an inner diameter of a face 156 that defines an entrance into the swivel 144 and smaller than an outer diameter of face 156 that defines the entrance to the swivel 144 such that at least a portion of a rear surface 158 (and, in some embodiments, only a portion) adjacent to the outer edge 152 can abut the face 156 of the swivel 144 when the one piece cap 140 is installed. The radius of the outer edge 152, the circular shape of the front surface 154 and the planar nature of the front surface advantageously reduce the likelihood that a hand tool can be used to rotate the cap 140 when installed into the swivel 144. Other configurations also are possible.

The intermediate threaded portion 148 of the plug 142 generally comprises a cylindrical body 160 that comprises an external thread 162. The thread 162 of the cylindrical body 160 defines a diameter D2. In the illustrated configuration, the diameter D2 is the diameter measured across the root of the threads 162. The diameter D2 and the configuration of the thread 162 is such that the intermediate threaded portion 148 of the plug can be threaded into the internal thread of the swivel 144. In addition, the spacing between the rear surface 158 and the thread 162 is such that the cap 140 can be fully tightened using the thread 162 until the rear surface 158 abuts against the face 156 of the swivel 144. The rear portion 150 of the plug 142 generally comprises a cylindrical body that defines a diameter D3. In the illustrated configuration, the diameter D3 and the configuration of the rear portion 150 is such that the rear portion 150 can be positioned inside the pipe 145 of the fire department connection. In some configurations, the rear portion 150 provides sufficient material to receive threads to couple to the threaded fastener 164.

The threaded fastener 164 extends through a threaded opening defined in the plug 142. A rear end of the threaded fastener 164 receives a nut 170. The nut 170 can be a lock nut or can be secured to the threaded fastener 164 in any suitable manner such that the threaded fastener 164 is locked for rotation with the plug 142. Other configurations (e.g., keys and the like) can be used to secure the threaded fastener 164 against rotation relative to the plug 142.

As described above, the head 166 of the threaded fastener 164 can comprise special geometry such that the threaded fastener is difficult to turn using ordinary hardware store bought implements. Turning the threaded fastener 164 results in rotation of the plug 142 such that the one piece cap 140 can be threaded tightly into the fire department swivel. When fully seated against the swivel, the one piece cap exerts sufficient force against the swivel to cause sufficient friction such that unauthorized removal is resisted, thwarted, or prevented. The threaded fastener 164 can be disposed in a recess 168 to impair unauthorized manipulation of the threaded fastener 164.

FIGS. 6, 7, 8, and 9 illustrate a locked swivel guard cap 180 that is arranged and configured in accordance with certain features, aspects, and advantages of certain embodiments of the present invention.

Figure 6:
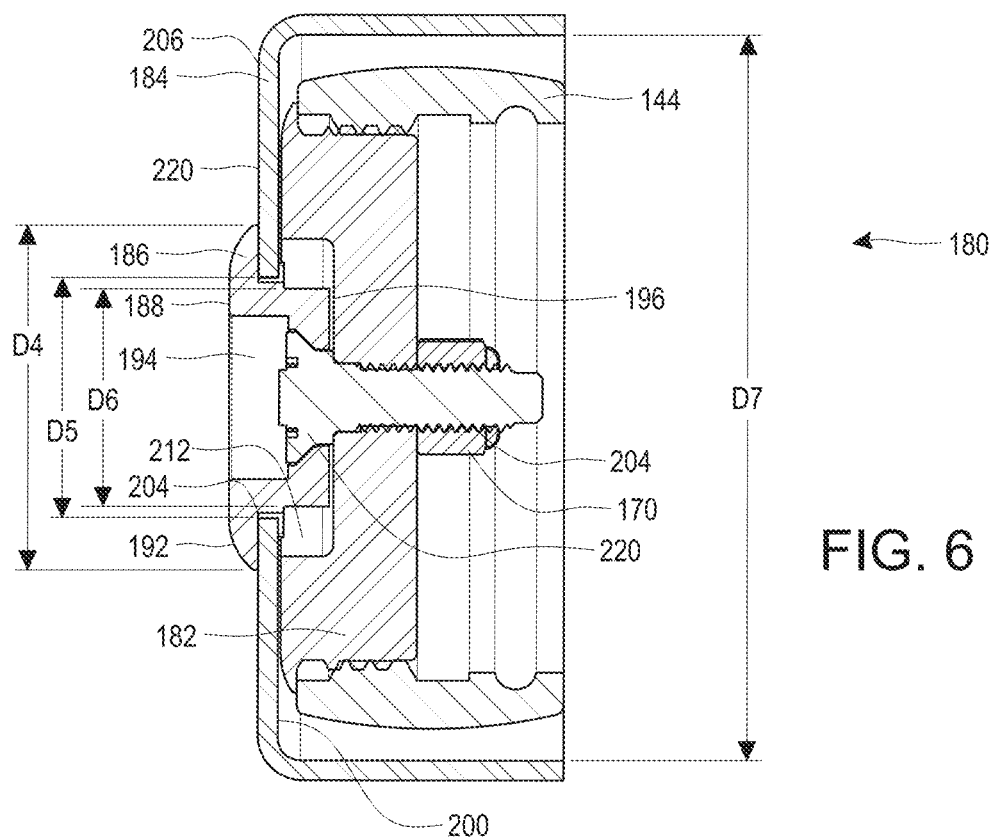
FIG. 6 is a sectioned side view of a third exemplary locking cap embodiment that is arranged and configured in accordance with certain features, aspects, and advantages of the present invention.
Figure 7:
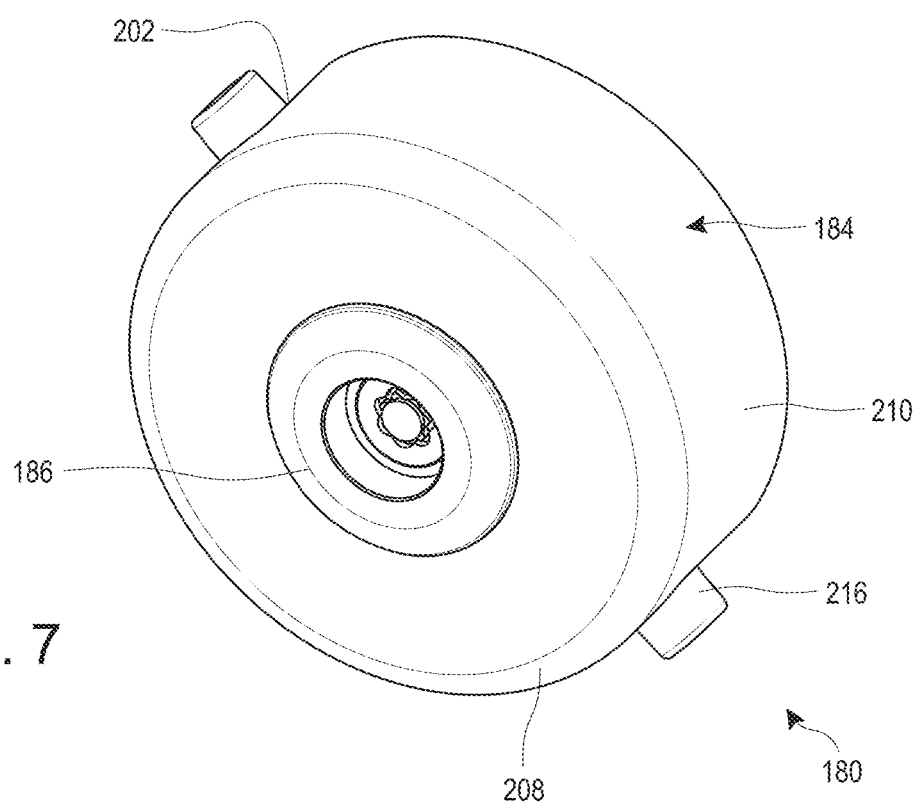
FIG. 7 is a front perspective view of the locking cap of FIG. 6 shown installed in a swivel of a fire department connection.
Figure 8:
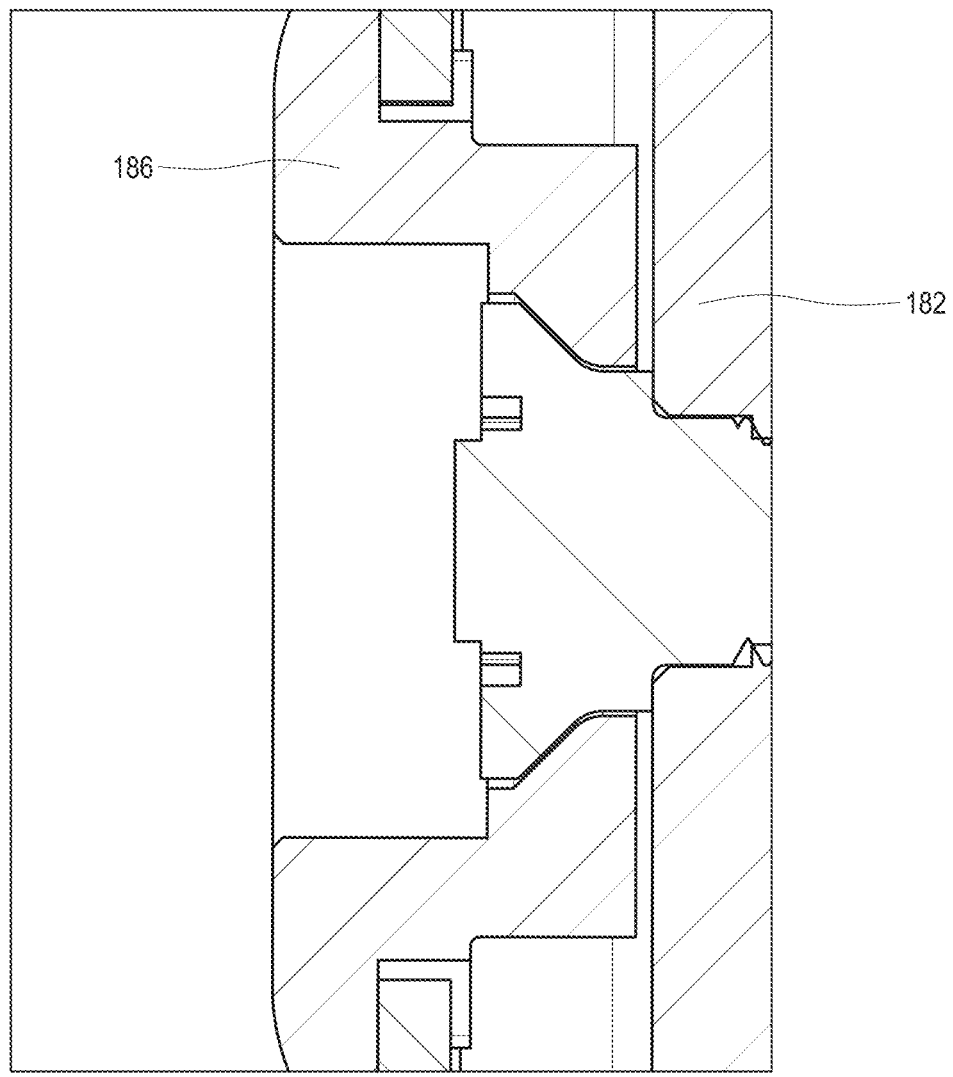
FIG. 8 is an enlarged portion of a sectioned side view of a fourth exemplary locking cap embodiment that is arranged and configured in accordance with certain features, aspects, and advantages of the present invention.

With reference to FIG. 6, the illustrated cap 180 primarily comprises a cylindrical body 182, a swivel guard 184 and a cover 186. As will be described below the cap 180 can be sized and configured to insert into the swivel 144 of the fire department connection.

The cover 186 may have a front face 188. Preferably, disposed centrally on the front face 188 is a recess 194. The recess 194 preferably is sized and configured to receive a fastener 220. The fastener 220 may be similar in many aspects to the fastener 164. The cover 186 may also have a rear surface 196. The rear surface 196 may be opposite the front surface 188. The circumferential edge of the cover 186 may have a radiused edge 192. The radius is preferably 0.020 inch or less. To achieve the benefits of the radiused surface the radius may be 0.075 inch or less. As discussed above, the radiused edge 192 advantageously helps thwart removal of the cap as discussed in connection with radiused edges elsewhere in this document.

A forward portion of the cover 186 has an outer diameter D4 that preferably is larger than a diameter of an opening 204 on the swivel guard 184. The cover 186 has a diameter D5 that preferably fits within the opening 204. The cover 186 has a diameter D6 that fits in the recess 212 of the cylindrical body 182.

The cylindrical body 182 may be similar in many aspects to the plug 142 described above. The illustrated cylindrical body 182, however, includes the cover receiving recess 212. As discussed above, the cylindrical body 182 omits the portion of the plug 142 with the diameter D3.

The opening 204 of the swivel guard is disposed centrally on the front wall 206 of the swivel guard. The front wall 206 includes the back surface 200. The illustrated swivel guard has a rounded edge 208 disposed circumferentially around the front 206. The side surface 210 extends rearwardly from the rounded edge 208. The side surface 210 preferably is sized and configured to cover the swivel 144 when the cap 180 is installed to the swivel 144. Disposed on the sides 210, the guard 184 may have notches 202. The notches 202 preferably are each sized and configured to receive a swivel lug 216. The swivel guard 184 has an inner diameter D7 that allows the swivel 144 to fit inside the guard 184.

The cylindrical body 182 may be assembled with the swivel guard 184 and the cover 186 by a fastener 220 extending through the cover 186 and the body 182. A nut 170, or other locking mechanism or technique, can be used to hold the assembly together. In the illustrated configuration, red loctite, welding, or another method of fastening can be used to secure the nut 170 in position relative to the fastener 220. As described above, the fastener 220 is threaded into an opening in the body 182 and the nut 170 is used to prevent relative rotation between the fastener 220 and the body 182.

Figure 9:
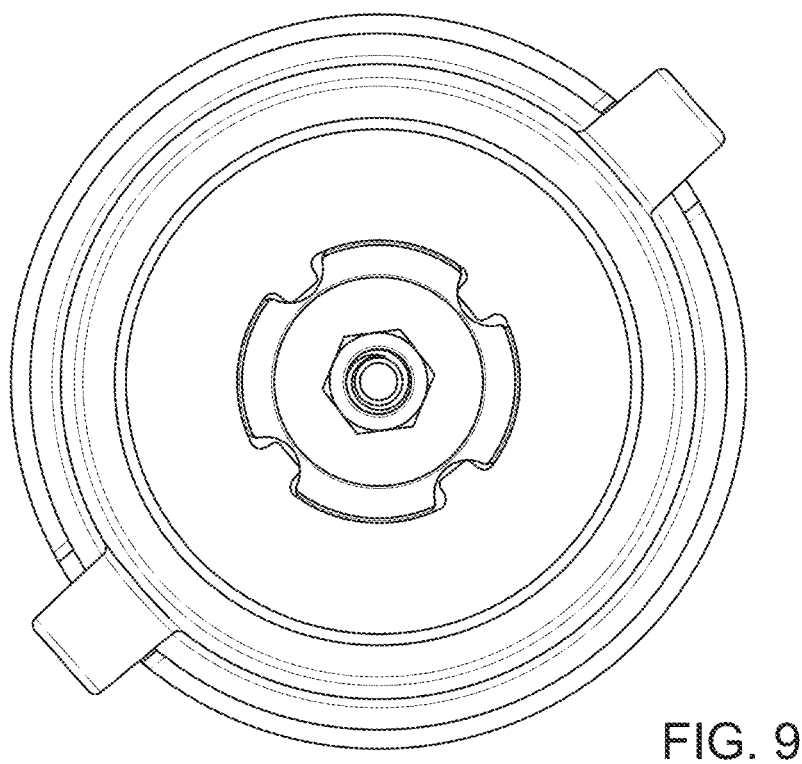
FIG. 9 is a rear view of the locking cap of FIG. 8.

The swivel guard 184 is retained by the cover 186 between the cover 186 and the body 182. In some configurations, the cover 186 can be configured to abut closely with the swivel guard 184 such that a flat tool, such as a screwdriver, cannot be easily inserted between the swivel guard 184 and the cover 186. Desirably, the swivel guard 184 can rotate relative to the body 182. In some configurations, the cover 186 and the swivel guard 184 both may spin relatively freely relative to the body 182. In some embodiments, as shown in FIG. 9, the cover 186 may be locked with multiple teeth to the swivel guard 184. In other words, the opening in the center of the illustrated swivel guard 184 incorporates teeth that are received within recess formed in the outer periphery of the cover 186. This restricts motion of the cover 186 relative to the swivel guard 184. This may allow the swivel guard 184 and cover 186 to stay stationary and prevent attacks that may rotate the threaded body.

To install and lock the cap 180, the assembly is inserted into the swivel 144 such that the notches 202 receive the swivel lugs 216. To tighten the cap 180 into place, the body 182 is rotated relative to the swivel 144 and threaded into the swivel 144. Once the cylindrical body 182 has been threaded into the swivel 144, the final tightening may, in some embodiments, be completed with a specialized tool inserted into the fastener 220 as discussed above. When the cap 180 is tightened against the swivel 144, the cylindrical body 182 exerts a force on the swivel 144. This force increases the frictional load between the body 182 and the swivel 144. The reverse process can be used to remove the cap 180 from the swivel 144.

Figure 10:
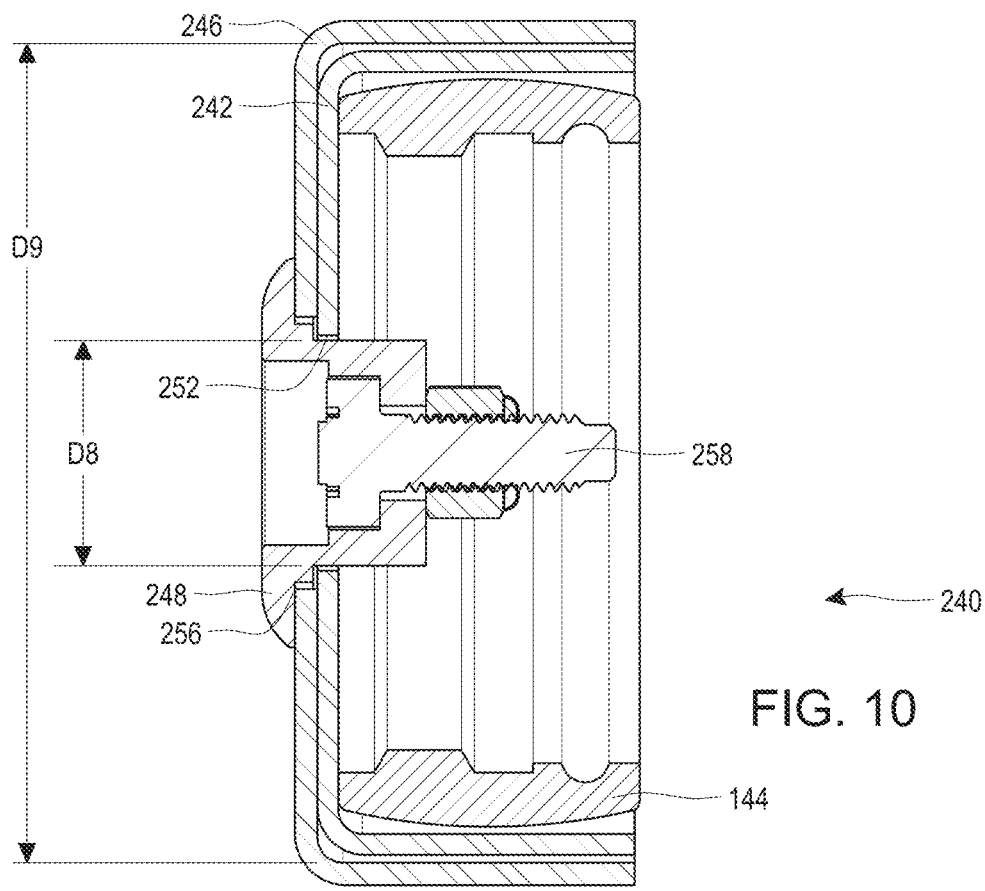
FIG. 10 is a sectioned side view of a fifth exemplary locking cap embodiment that is arranged and configured in accordance with certain features, aspects, and advantages of the present invention.
Figure 11:
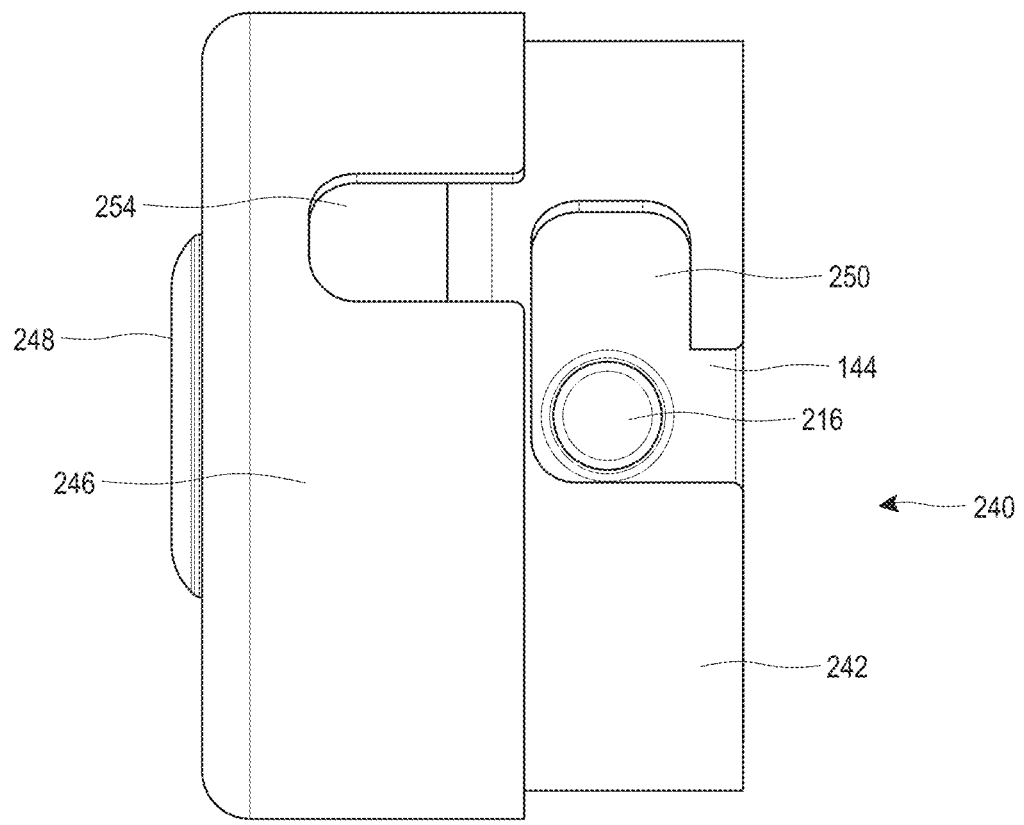
FIG. 11 is a side view of the locking cap of FIG. 10 in a partially assembled configuration.
Figure 12:
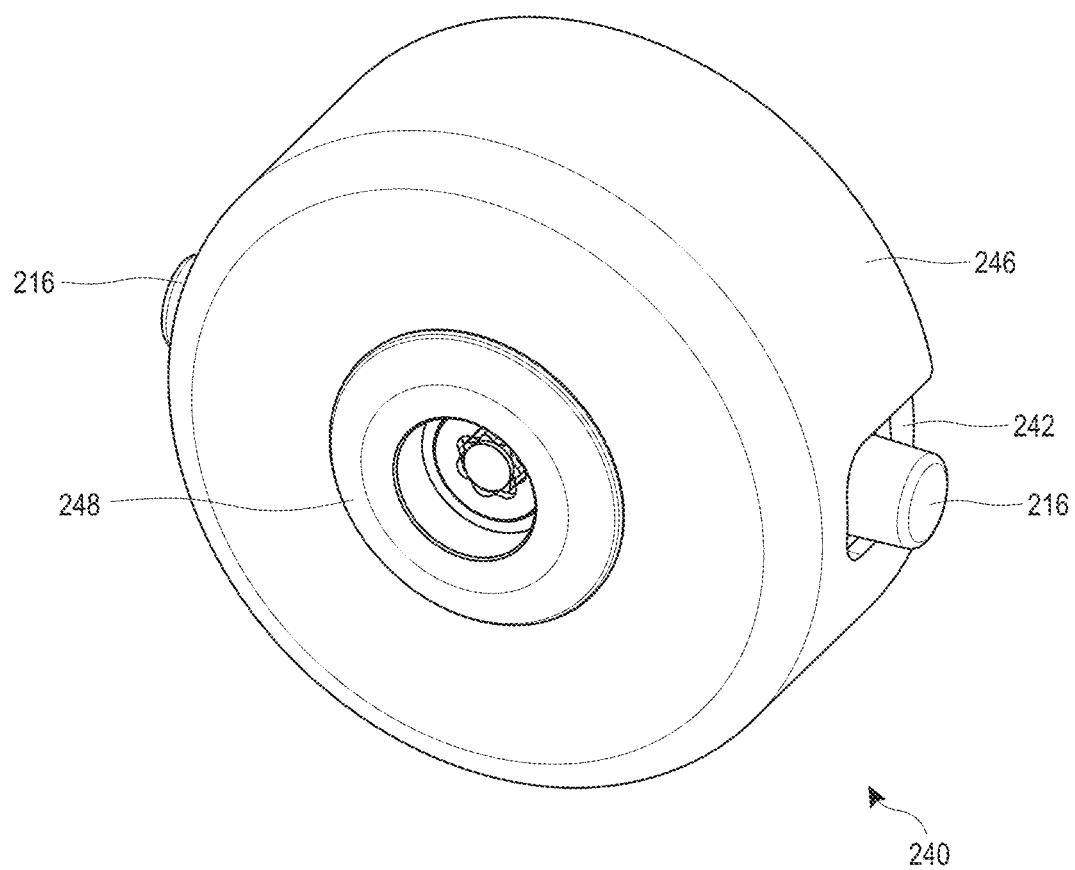
FIG. 12 is a front perspective view of the locking cap of FIG. 10 in an assembled configuration.

FIGS. 10, 11, and 12 illustrate a lug lock cap 240 that is arranged and configured in accordance with certain features, aspects, and advantages of certain embodiments of the present invention.

With reference to FIG. 10 the illustrated cap 240 primarily comprises a cylindrical body, an outer swivel guard 246, an inner swivel guard 242, and a cover 248. Not shown in FIG. 10 is a central plug portion. Any central plug portion can be used with the dual swivel guards 246, 242 that are described herein. As will be described below, the cap 240 can be sized and configured to insert into the swivel 144 of the fire department connection.

While the plug portion is not shown, the plug can be defined by a cylindrical body that can be similar to the cylindrical body 182 described above. In addition, the cover 248 preferably is similar in many aspects to the cover 186 described above. The cover 248 may differ from the cover 186 in that the diameter D5 corresponds with the outer guard opening 256 while an additional diameter D8 corresponds with the inner guard opening 252. The outer swivel guard 246 and the inner swivel guard 242 preferably are similar to the swivel guard 184. In addition, the fastener 258 preferably is similar to the fastener 220. The outer swivel guard 246 preferably is sized and configured to allow the inner swivel guard 242 nest inside. The diameter D9 is sized and configured to fit over the inner swivel guard 242.

As shown in FIG. 11, the outer swivel guard 246 preferably has a notch 254. The notch 254 may be a straight shape such that it can slide directly over the swivel lug 216. The inner swivel guard 242 preferably has notches 250 that are configured to retain the lug 216. In some configurations, the notches 250 may be 'L' shaped to retain the swivel lugs 216. In other words, the 'L' shape is configured such that the inner swivel guard 242 may be place over the swivel lug 216 and then rotated to be locked into place. In some embodiments, the inner notch 250 may have a design different than an L-shape. For example, it could be shaped as a 'C' or as a diagonal or a 'T' or other shapes. The inner notch 250 could be shaped as a straight notch. The outer notch 254 could be shaped as an L, a T, a swivel, a C, or another shape.

When a user installs the illustrated cap 240, the inner swivel guard 242 is slid over the swivel such that the lug 216 is positioned in the corresponding notch 250. Then the inner guard 242 may be rotated to capture the swivel lug 216 within the notch 250 such that significant axial movement is thwarted. The outer swivel guard 246 is passed over the lug 216 such that the lug 216 is retained within the notch 254 of the outer swivel guard 246. Finally, the bolt 258 and the cover 248 are tightened to lock the assembly into place. In some configurations, the cylindrical body 182 is installed into the swivel 144 before attaching the inner swivel guard 242. In some embodiments the cylindrical body 182 may be modified to be threadless on the outer diameter.

Preferably, tightening the bolt 258 restricts the linear translation of the inner swivel guard 242 and the outer swivel guard 246. Hence, once tightened the relative linear translation between the inner swivel guard 242 and the outer swivel guard 246 is constrained. Preferably, this results in the swivel lug 216 being retained within the inner notch 250 and the outer notch 254. The swivel lug 216 prevents rotation of the combined inner swivel guard 242 and outer swivel guard 246.

With respect to translation in the assembled configuration, all of the cover 248, the outer swivel guard 246, the inner swivel guard 242, the fastener 258, and the nut 170 may be fixed relative to each other. In the loosened configuration, these parts may be able to move relative to each other. Once translated, the outer swivel guard 246 and the inner swivel guard 242 can be rotated relative to each other to disengage from the swivel lug 216.

In some embodiments, in the locked configuration, the outer swivel guard and the inner swivel guard may have a friction fit together. In other embodiments, they may have no friction fit between each other and may be able to rotate freely between each other if not for the swivel lug 216.

In some embodiments, in the locked configuration, the cover 248 may be fixed relative to either the outer swivel guard 246 or the inner swivel guard 242. In some embodiments, the cover 248 may freely rotate with regard to the outer swivel guard 246 and the inner swivel guard 242. In some embodiments, the cover 248 may be fixed to both. The cover 248 could be fixed in any suitable manner. This design may have the advantage of not having to be specifically fitted to a particular FDC. This design may have the advantage that it can be applied to lugs of various sizes. In some embodiments, the cap may be suitable to apply to swivels with various sizes and configurations.

With reference now to FIGS. 13-16, a further lockable cap 400 embodiment will be described that is arranged and configured in accordance with certain features, aspects and advantages of the present invention. The lockable cap 400 can be secured within a swivel 401 (see FIG. 15) of a fire department connection, for example but without limitation. In the illustrated configuration, the lockable cap 400 comprises a first portion 402 and a second portion 404. The first portion 402 and the second portion 404 are axially movable relative to each other. As will be explained, through the relative axial movement, a friction load between a threaded portion of the lockable cap 400 and a threaded portion of the swivel 401 can be increased. Moreover, an additional friction load can be established between another portion of the lockable cap 400 and the swivel 401. The increased friction load makes removal of the locking cap 400 from the swivel 401 more difficult.

Figure 13:
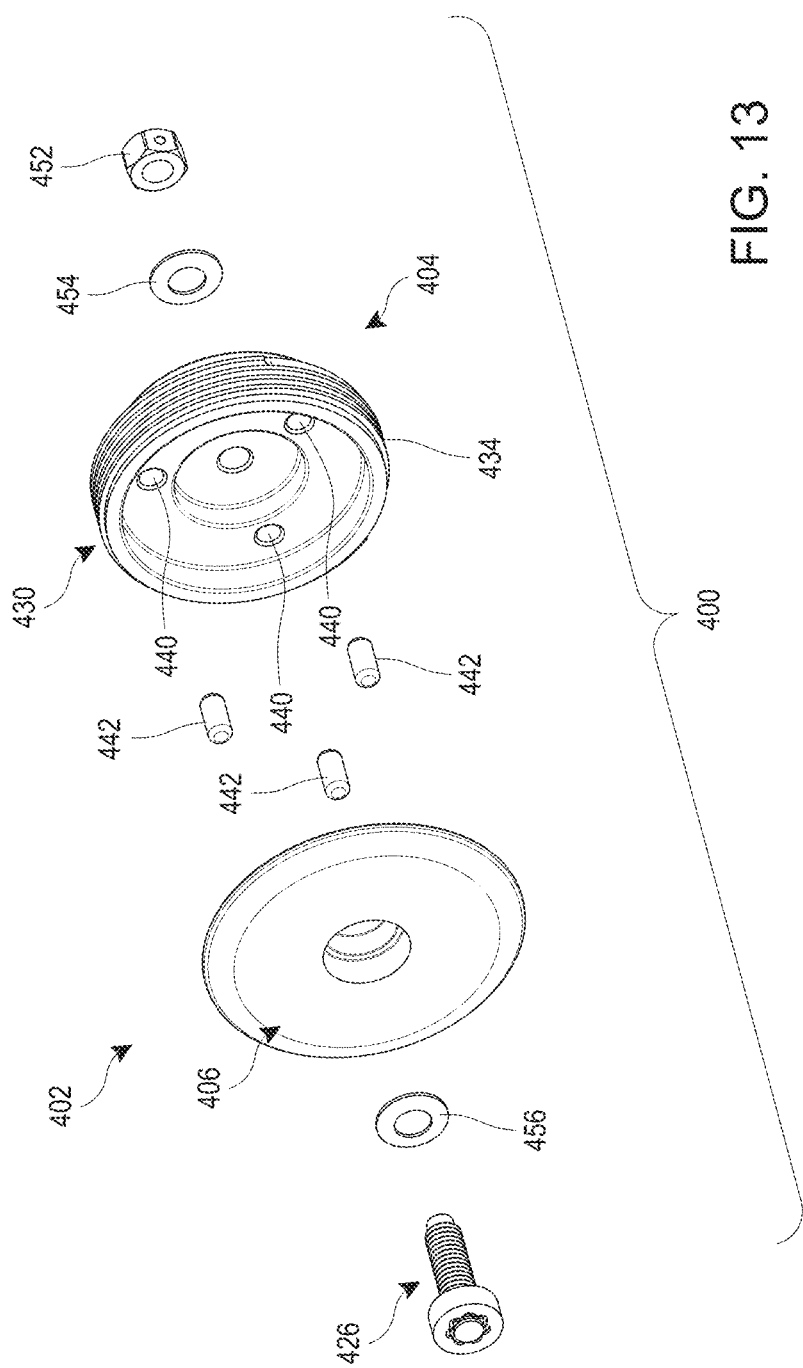
FIG. 13 is an exploded view of a sixth exemplary locking cap embodiment that is arranged and configured in accordance with certain features, aspects, and advantages of the present invention.
Figure 14:
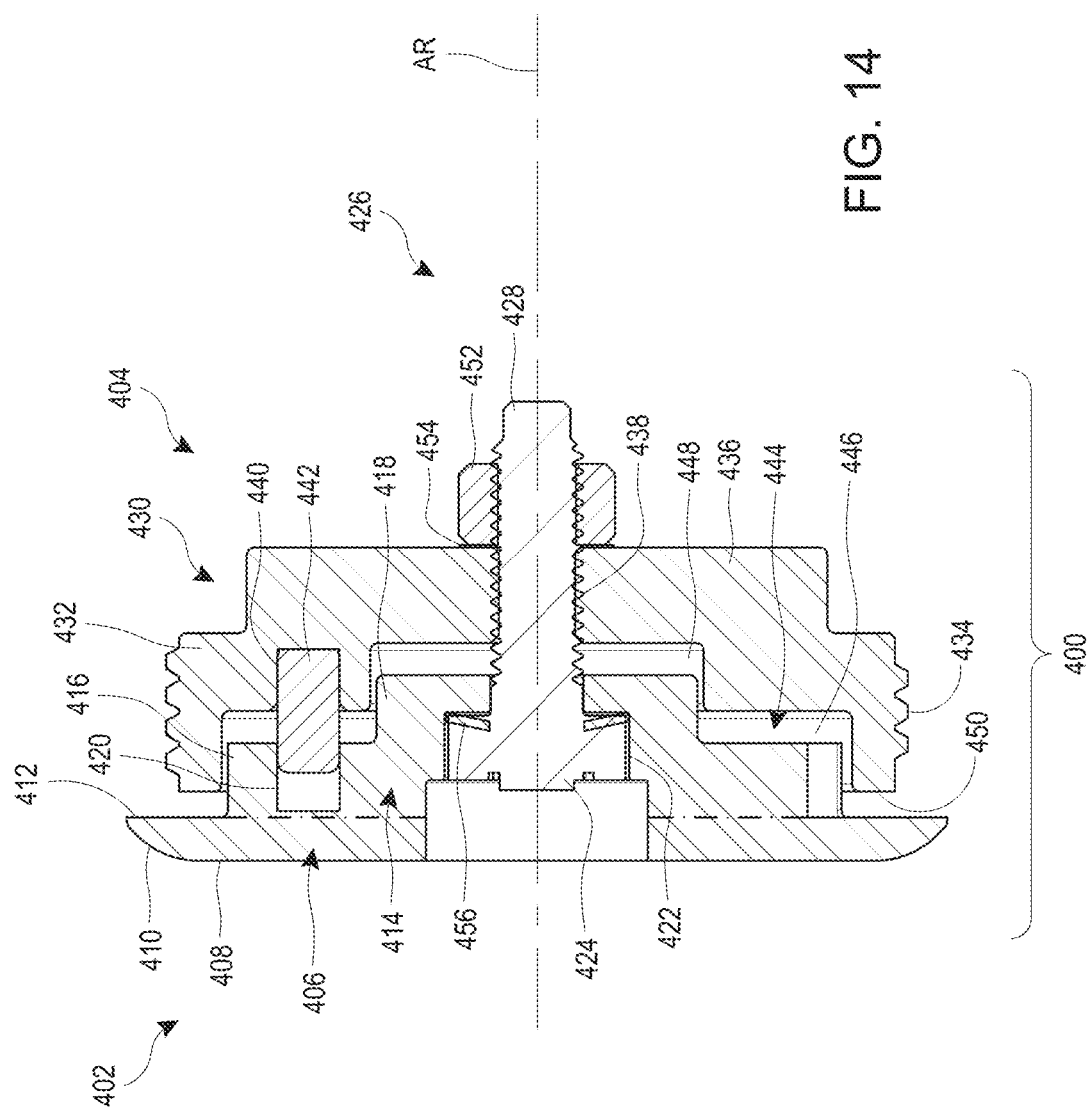
FIG. 14 is a sectioned side view of the locking cap of FIG. 13 in an unlocked configuration.
Figure 15:
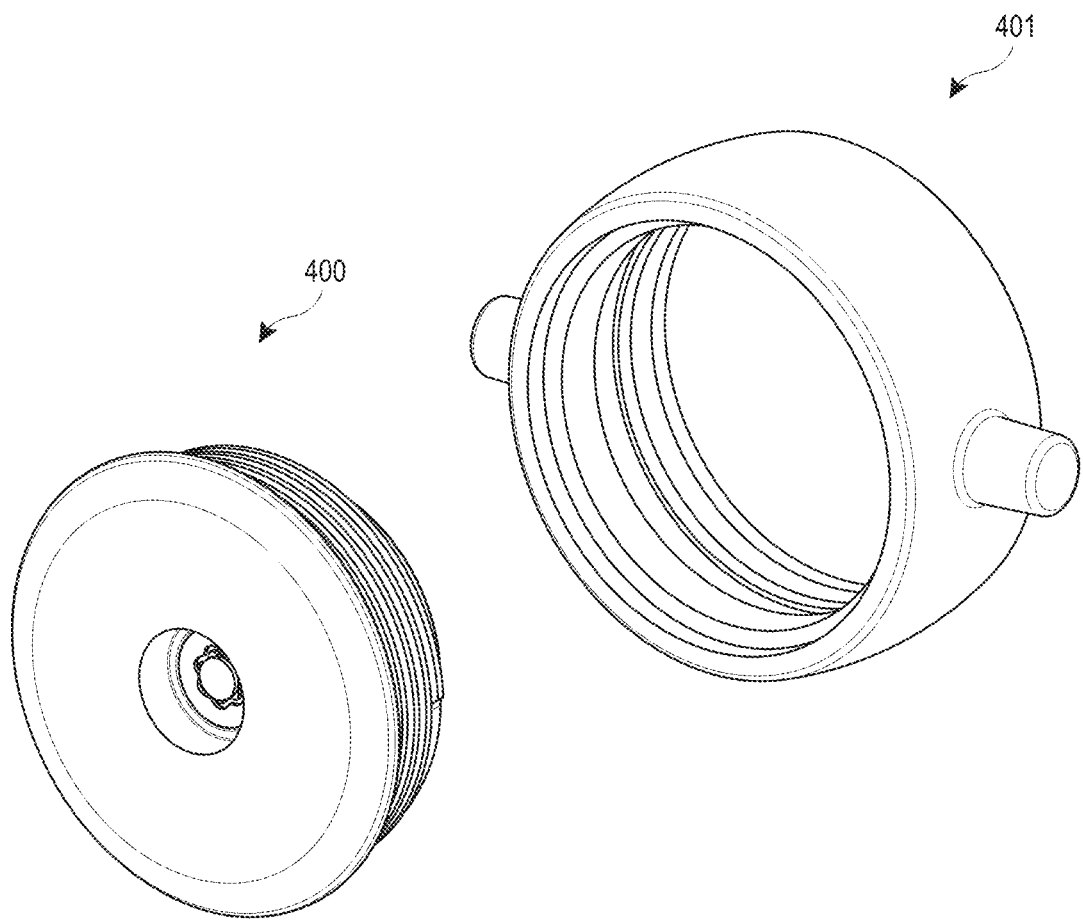
FIG. 15 is a front perspective view of the locking cap of FIG. 13 shown unassembled to a swivel of a fire department connection.

With reference to FIGS. 13 and 14, the first portion 402 comprises the front cover 406. The front cover 406 comprises a front surface 408. The illustrated front surface 408 is generally planar. By being generally planar, the front surface 408 can make unauthorized removal of the locking cap 400 more difficult because there are less places for a tool to gain purchase on the locking cap 400.

In some configurations, the front surface 408 is generally circular. The illustrated front surface 408 extends radially outward to a sidewall 410. The illustrated sidewall 410 is defined by a radiused surface. The radius is preferably 0.020 inch or less. To achieve the benefits of the radiused surface the radius may be 0.075 inch or less. The radius results in the sidewall 410 curving to the rear from the front surface 408. The radius also makes unauthorized access more difficult because the radius renders the sidewall more difficult to grasp with common hand tools.

The end of the sidewall 410 furthest from the front surface 408 defines an outer diameter. The outer diameter of the sidewall 410 is smaller than an outer diameter of the swivel 401 of the fire department connection. The outer diameter of the sidewall 410 is larger than an inner diameter of the swivel 401 of the fire department connection. Such sizing allows the front cover 406 to overlap with the forwardmost surface of the swivel 401 without extending beyond the outermost portion of the forwardmost surface of the swivel 401 (see FIG. 16).

The sidewall 410 terminates at a rear surface 412. The illustrated rear surface 412 extends radially inward from the sidewall 410. In some configurations, the rear surface 412 is generally parallel with the front surface 408. The illustrated rear surface 412 is generally annular and does not span the full diameter of the front surface 408.

With reference to FIG. 14, the front cover 406 also comprises a coupling portion 414. The coupling portion 414 extends rearward from the rear surface 412. In some configurations, the coupling portion 414 comprises at least one generally cylindrical structure 416. In the illustrated configuration, the coupling portion comprises the generally cylindrical structure 416 and a second, smaller diameter generally cylindrical structure 418. The second cylindrical structure extends rearward from the cylindrical structure 416. Other configurations are possible.

Pockets 420 can be formed in the cylindrical structure 416. In the illustrated configuration, three pockets 420 are positioned about every 120 degrees around the axis of rotation. More pockets 420 or less pockets 420 can be used. The illustrated pockets are generally cylindrical pockets 420. Each of the pockets 420 can be defined by a blind hole or the like. The pockets 420 can extend into the front cover 406 in some configurations.

A stepped bore 422 extends axially through the first portion 402. In the illustrated configuration, the stepped bore 422 extends along an axis of rotation AR for the lockable cap 400. In some configurations, an axis of the stepped bore 422 also is the axis of rotation AR for the lockable cap 400. While the illustrated stepped bore 422 comprises three different diameters, more or fewer diameters can be used. The largest diameter is adjacent to the front surface 408. The intermediate diameter accommodates a head 424 of a fastener 426. The smallest diameter is accommodates a threaded shaft 428 of the fastener 426. In some configurations, the fastener 426 can be integrally formed as one piece with the front cover 406 or the coupling portion 414 of the first portion 402.

The second portion 404 comprises a plug portion 430. The illustrated plug portion 430 has two outer diameters. The first portion 432 has the larger outer diameter, which is sized and configured to interface with a threaded portion of the swivel of the fire department connection. The first portion 432 comprises a threaded outer surface 434. The threaded outer surface 434 is sized and configured to mate with the threads of the swivel. The second portion 436 has the smaller outer diameter, which is sized and configured to be received within the mouth of the fire department connection.

A threaded opening 438 is formed in the plug portion 430. The threaded opening 438 extends axially through the plug portion 430. In the illustrated configuration, the threaded opening 438 extends axially through the second portion 436 of the plug portion 430. The threaded opening 438 can have an axis this is aligned with the axis of rotation of the lockable cap 400. In the illustrated configuration, the threaded opening 438 is aligned with the stepped bore 422. The shaft 428 of the threaded fastener is received within the threaded opening 438.

With continued reference to FIG. 14, the first portion 432 of the plug portion 430 comprises pockets 440. Similar to the pockets 420, the plug portion 430 can have as few as one pocket 440 or more than three pockets 440. The pockets 440 can be formed by a blind hole or in any other suitable manner. In the illustrated configuration, the pockets 440 of the plug portion 430 align with the pockets 420 of the front cover 406.

The pockets 420, 440 receive pins 442. The pins 442 allow relative axial movement between the first portion 402 and the second portion 404. The pins 442 secure the first portion 402 and the second portion 404 together for rotation. Other configurations (e.g., splines, etc.) also can be used to secure the first portion 402 and the second portion 404 for joint rotation while allowing for relative axial movement between the first portion 402 and the second portion 404. In some configurations, the pins 442 can be integrally formed in one piece with the plug portion 430. In some configurations, the pins 442 can be integrally formed in one piece with the front cover 406 or coupling portion 414. In some configurations, a first set of pins 442 can be integrally formed in one piece with the front cover 406 or the coupling portion 414 while a balance of the pins 442 can be integrally formed in one piece with the plug portion 430.

To accommodate the coupling portion 414 of the first portion 402, the second portion 404 includes a complementary recess 444. Because the coupling portion 414 is tiered, the complementary recess has a first region 446 and a second region 448. The first region 446 receives the cylindrical portion 416 and the second region 448 receives the second cylindrical portion 418. Preferably, the depths of the first region 446 and the second region 448 are such that the rear surface 412 of the front cover 406 will contact a face 450 of the first portion 432 of the plug portion 430. In other words, the face 450 and the rear surface 412 define a stop to relative axial movement between the first portion 402 and the second portion 404 of the lockable cap 400.

A nut 452 can be used to secure the first portion 402 and the second portion 404 against excessive relative axial movement. A washer 454 can be positioned between the nut 452 and the adjacent surface of the plug portion 430. Another washer 456 can be positioned between the head 424 and the stepped bore 422 of the front cover 406. The washer 456 can be conical and can provide a load to the fastener 426 when the washer 456 is compressed between the head 424 and the adjacent portion of the stepped bore 422. The nut 452 can be secured in position along the threaded fastener 426 in any suitable manner.

To lock the lockable cap 400, first the lockable cap 400 is threaded into the swivel 401 when the lockable cap 400 is in the unlocked position. The pins 442 and the pockets 420, 440 cause the first portion 402 and the second portion 404 to rotate together. In the unlocked position (see FIG. 14), the lock nut 452 and the nylon washer 454 press against a rear surface of the second portion 404. Accordingly, the lockable cap 400 can be threaded by hand or using a tool. In the illustrated configuration, the lockable cap 400 can be threaded into position in a clockwise direction. The lockable cap 400 can be threaded into the swivel 401 until a small gap or no gap exists between the rear surface 412 of the front cover 406 and the face 450 of the plug portion 430. Additionally, in the unlocked position, the gap between the front cover 406 and the plug portion 430 is enlarged relative to the locked position.

Once the locking cap 400 has been properly threaded into position within the swivel 401, the locking cap 400 can be secured in position relative to the swivel 401 by tightening the fastener 426. Turning the fastener 426 relative to the front cover 406 results in relative axial movement of the plug portion 430 and the front cover 406. In the illustrated configuration, turning the fastener 426 relative to the front cover 406 brings the front cover 406 and the plug portion 430 closer together.

Figure 16:
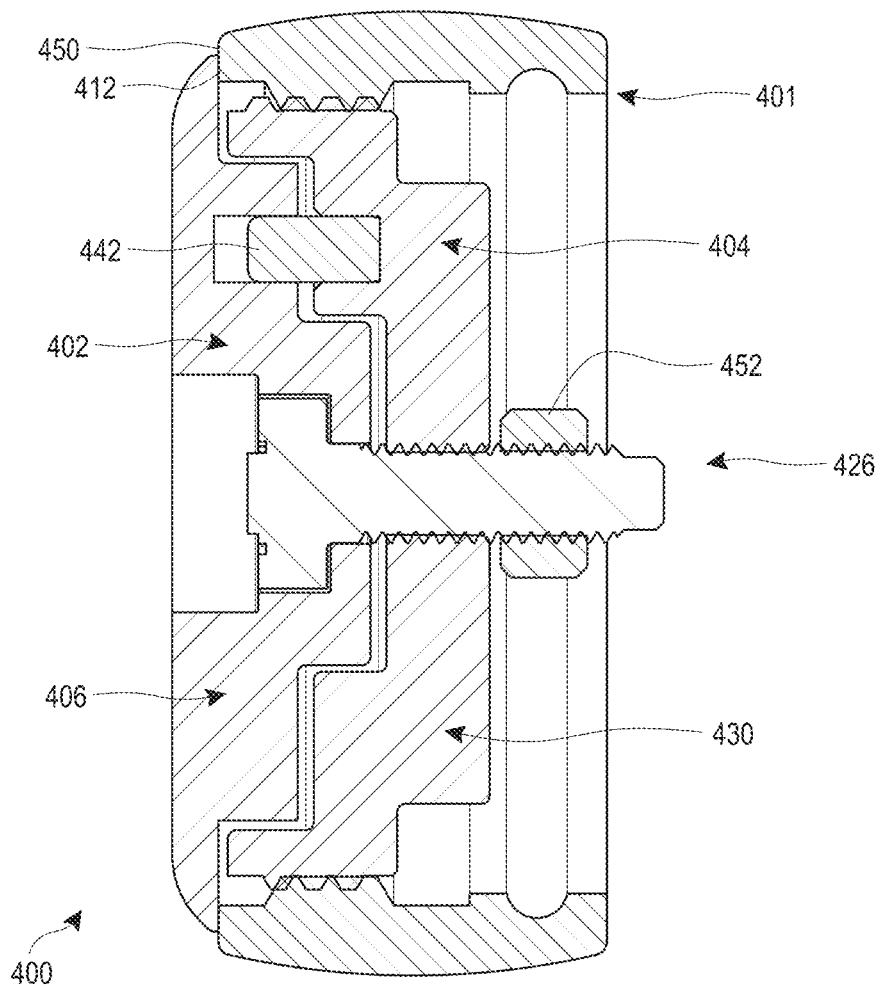
FIG. 16 is a sectioned side view of the locking cap of FIG. 13 in a locked configuration.

With reference to FIG. 16, the lockable cap 400 is shown in the locked configuration. In the locked configuration, the gap between the front cover 406 and the plug portion 430 is reduced in size relative to the unlocked position. In the locked position, the gap between the nut 452 and the second portion 404 is increased relative to the unlocked position.

When the threaded fastener 426 is further tightened, a load is applied between the front cover 406 and the plug portion 430 (e.g., at the rear surface 412 and the face 450). The load results in an increased friction that will resist rotation of the plug portion 430 relative to the swivel 401. Tightening the threaded fastener 426 also increases the axial load between the threads of the plug portion 430 and the threads on the swivel 401. Effectively, the threads of the swivel 401 are trapped between the threads of the plug portion 430 and the front cover 406. The increased axial load on the threads further increases the frictional forces resisting rotation of the plug portion 430 relative to the swivel 401.

Removing the lockable cap 400 simply is a reverse of installing the lockable cap 400. The fastener 426 can be turned in the opposite direction from tightening to loosen the fastener. As the fastener 426 rotates relative to the plug portion 430, the plug portion 430 moves away from the front cover 406. When the plug portion 430 contacts the washer 454 and the lock nut 452, the plug portion stops moving away from the front cover 406 and the fastener 426 stops rotating. At this point, the lockable cap 400 can be rotated by hand to unthread the lockable cap from the swivel 401.

In some configurations, the head 424 of the threaded fastener 426 can feature a special configuration such that a specially designed tool is required to turn the threaded fastener 426. The special configuration can comprise any desired design or configuration such that standard hardware store tools will not easily turn the threaded fastener.

Figure 17:
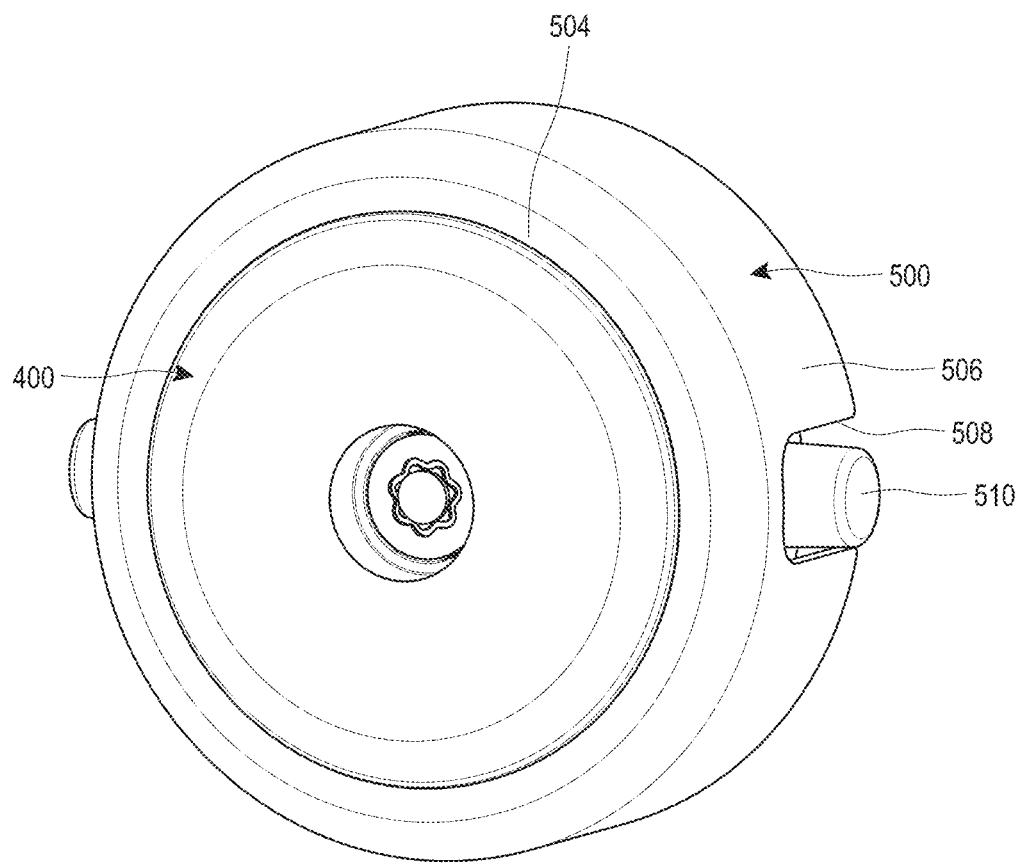
FIG. 17 is a front side perspective view of a seventh exemplary locking cap embodiment that is arranged and configured in accordance with certain features, aspects, and advantages of the present invention.
Figure 18:
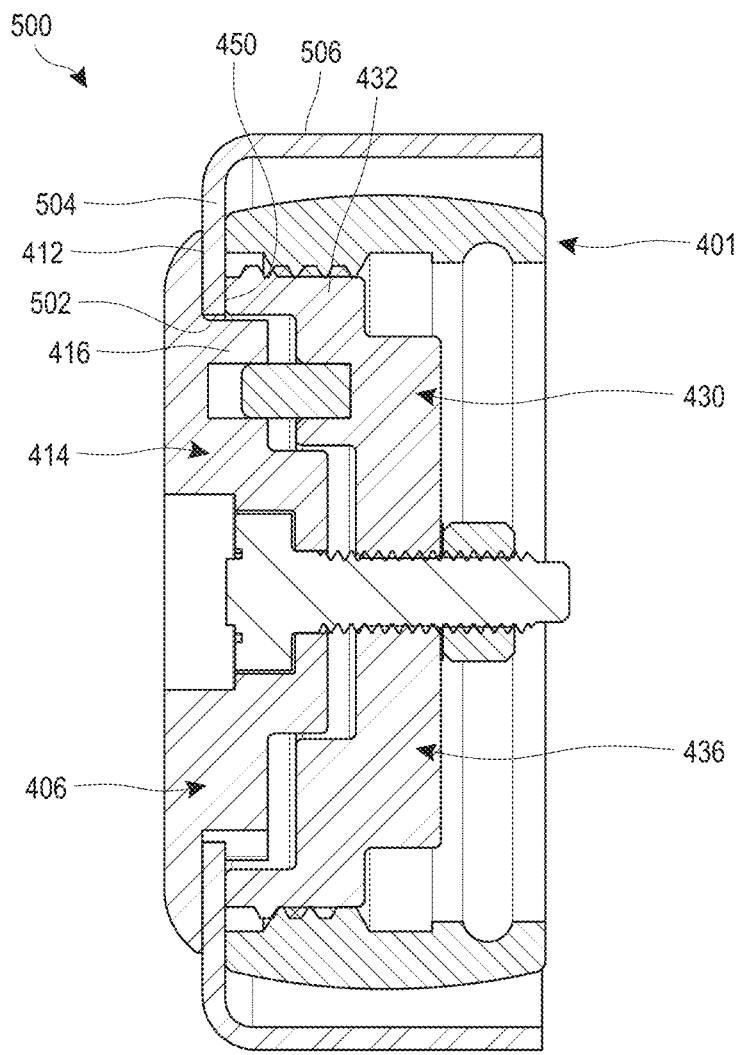
FIG. 18 is a sectioned side view of the locking cap of FIG. 17.

With reference to FIGS. 17 and 18, the lockable cap 400 of FIGS. 13-16 is shown in combination with a swivel guard member 500. The illustrated swivel guard member 500 comprises a central opening 502. The central opening 502 defines a diameter that accommodates the cylindrical portion 416 of the coupling portion of the front cover 406. In the illustrated configuration, the diameter of the central opening 502 is the same as the inside diameter of the first portion 432 of the plug portion 430.

The central opening 502 is defined by a forward wall 504. A sidewall 506 is connected to the outer diameter of the forward wall 504. The sidewall 506 extends rearward from the forward wall 504. Preferably, the sidewall 506 extends rearward sufficiently to protect the outer surface of the swivel 401. In some configurations, the sidewall 506 and the swivel extend the same distance rearward from the inside surface of the forward wall 504.

The sidewall 506 can comprise one or more notches 508. In the illustrated configuration, the sidewall 506 incorporates two notches 508. The notches 508 are sized and configured to accommodate two posts 510 that extend laterally outward from the swivel 401.

As shown in FIG. 18, an inner portion of the forward wall 504 can be captured between the rear surface 412 of the front cover 406 and the face 450 of the plug portion 430. In the illustrated configuration, the lockable cap 400 can rotate relative to the swivel guard member 500. Accordingly, the lockable cap 400 can be threaded into position once the swivel guard member 500 has been positioned such that the posts 510 of the swivel 401 will be received within the notches 508 of the sidewall 506 of the swivel guard member 500.

Figure 19:
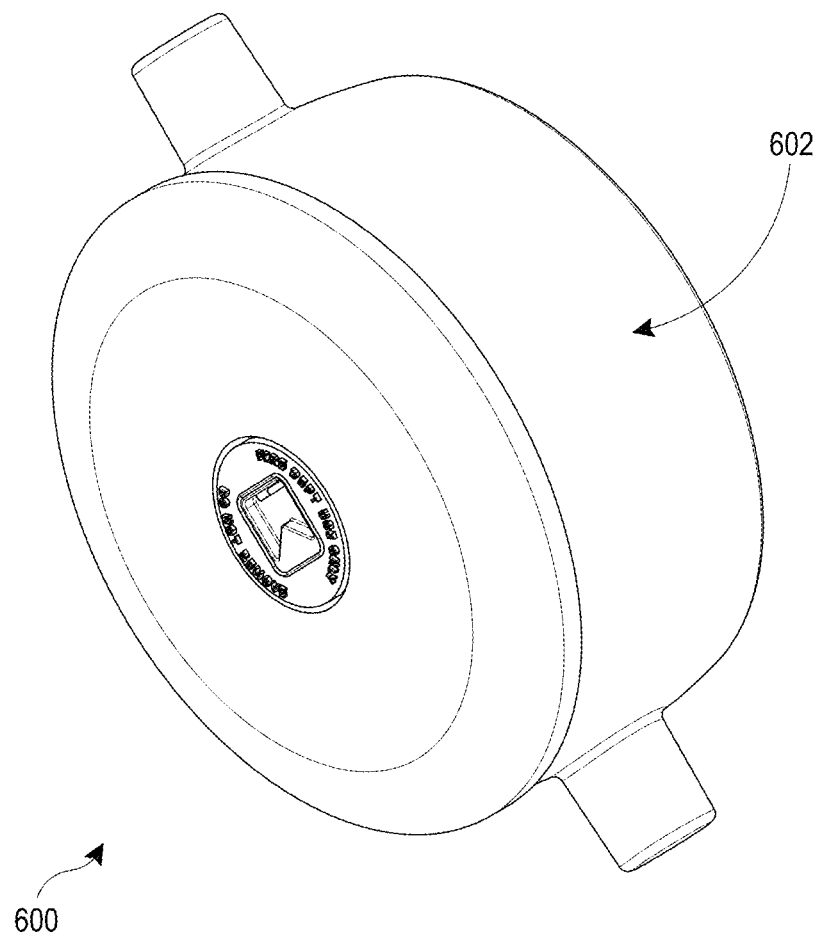
FIG. 19 is a front perspective view of an eighth exemplary locking cap embodiment that is arranged and configured in accordance with certain features, aspects, and advantages of the present invention.

FIGS. 19-22 illustrate a locking cap 600 that is arranged and configured in accordance with certain features, aspects, and advantages of certain embodiments of the present invention. The locking cap is illustrated in FIG. 19 installed into a swivel 602.

Figure 20:
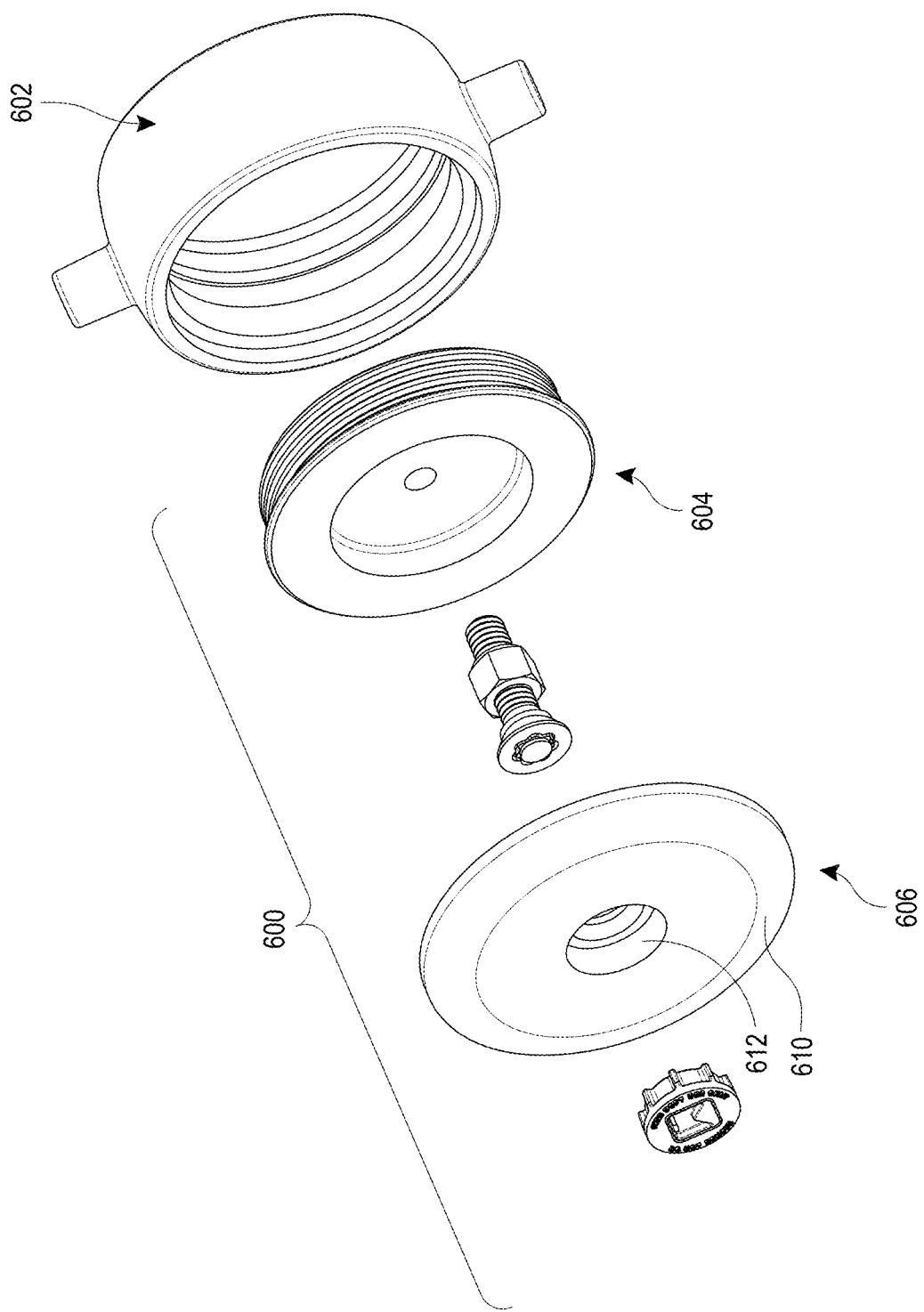
FIG. 20 is an exploded front perspective view of the locking cap of FIG. 19 and the swivel that can receive the locking cap of FIG. 19.
Figure 21:
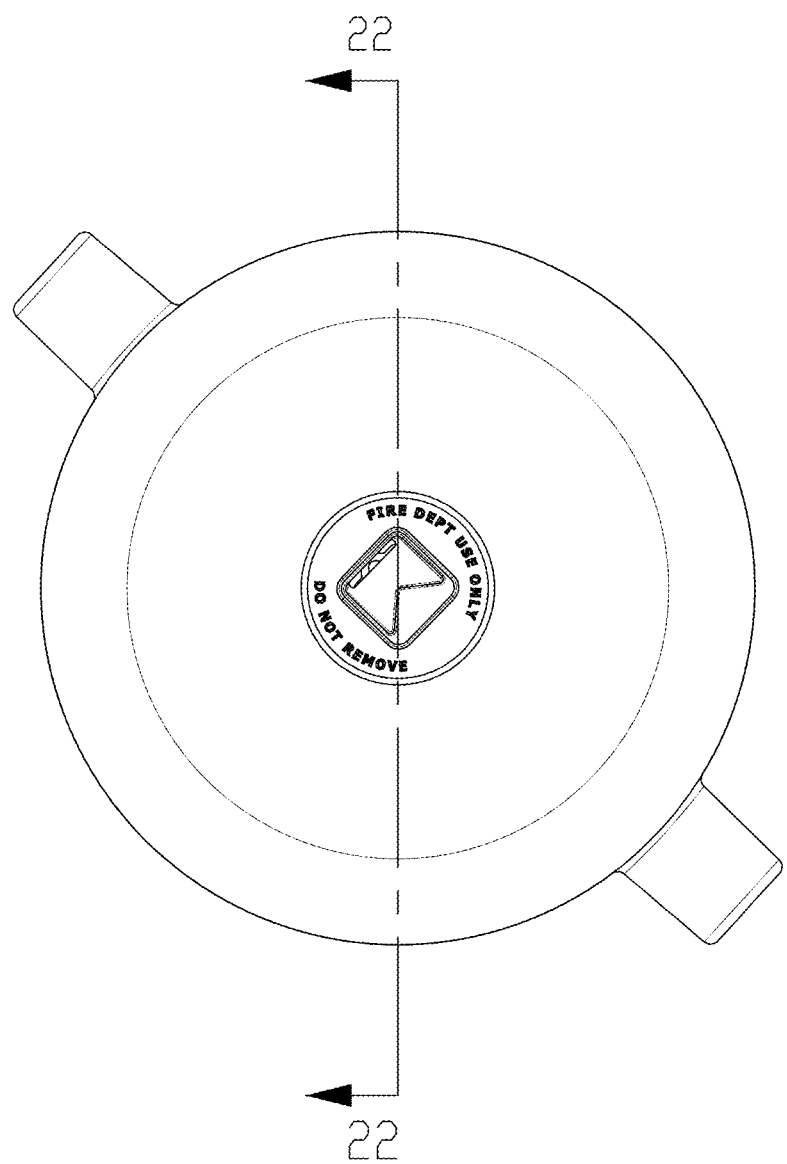
FIG. 21 is a front elevation view of the locking cap of FIG. 19 received within the swivel.

With reference to FIG. 20, the illustrated cap 600 primarily comprises a cylindrical body 604 and a cover 606. As will be described below the cap 600 can be sized and configured to insert into the swivel 602 of the fire department connection. In some configurations, the cap 600 can be sized and configured to be threaded into the swivel 602 of the fire department connection.

Figure 22:
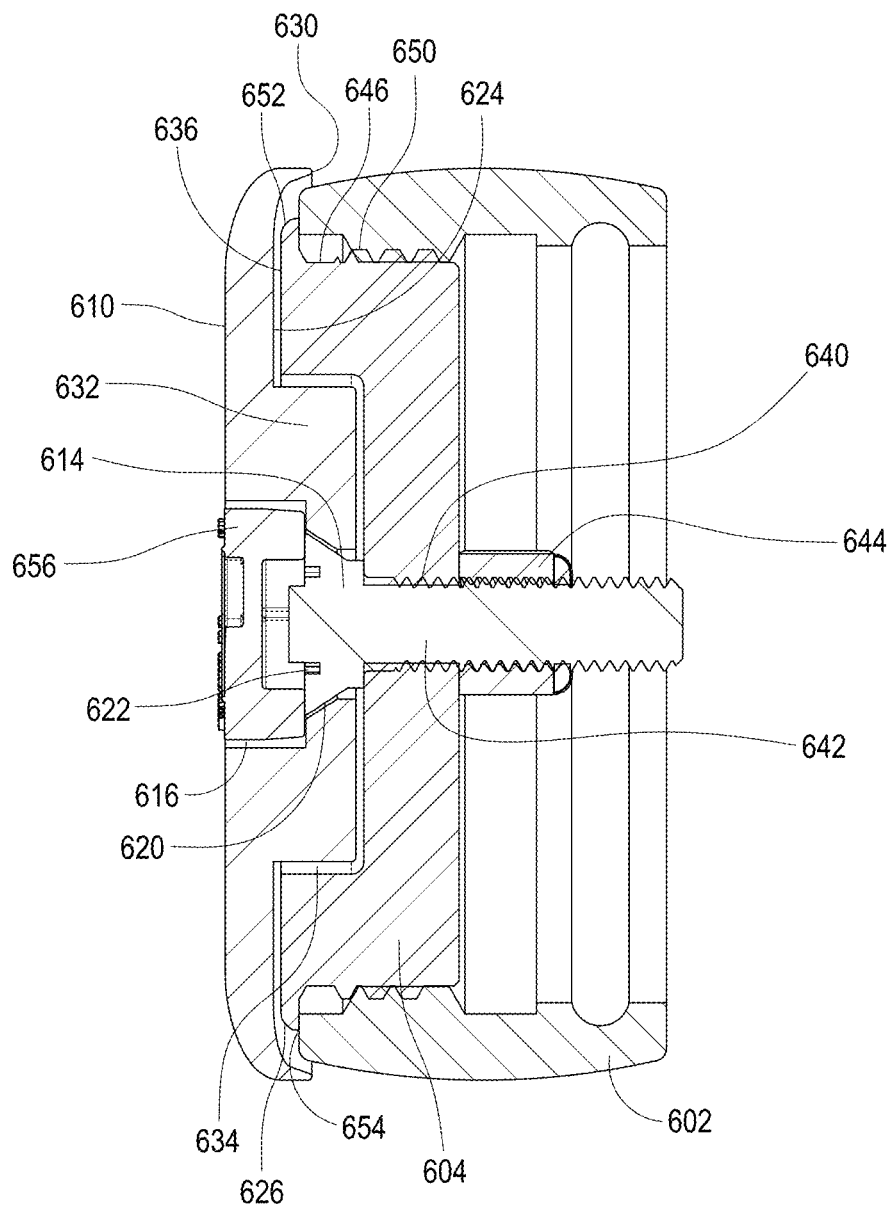
FIG. 22 is a section view taken along the line 22-22 in FIG. 21.

The cover 606 may have a front face 610. Preferably, disposed centrally on the front face 610 is a recess 612. The recess 612 preferably is sized and configured to receive a head of a fastener 614. The illustrated recess 612, as shown in FIG. 22, comprises a forward cylindrical portion 616 and a rearward conical or tapering portion 620. A step can be defined at the intersection of the cylindrical portion 616 and the tapering portion 620.

The fastener 614 may be similar in many aspects to the fastener 164 described above. The illustrated fastener 614 can have a specially designed head that accepts a specially designed driver tool. Such a configuration reduces the ability of someone to turn the fastener with a standard tool bought from a hardware store. In the illustrated configuration, the specially designed head comprises a channel 622 but other configurations of a unique patterned driver receptacle are possible. An outer surface of the head of the fastener 614 can taper such that a conical portion is defined. The conical portion can be received by the conical portion 620 of the recess 612.

The cover 606 extends radially outward further than the cylindrical body 604. A circumferential edge of the body 604 may comprise a radiused surface 626. The radius can be any desired radius and preferably is a radius of 0.020 inch or less. To achieve desired benefits, the radius may be 0.075 inch or less. As discussed above, the radiused surface 626 advantageously helps thwart removal of the cap as discussed in connection with radiused edges elsewhere in this document. The outer portion of the cover 606 helps to protect the radiused surface 626.

The cover 606 may also have a rear surface 624. The rear surface 624 may be opposite the front face 610. The rear surface 624 may be inset relative to a rearmost portion 630 of the cover 606. Accordingly, the illustrated cover 606 may define a dish-shape with the rear surface 624 being the bottom of the dish-shape. A central portion of the rear side of the cover 606 may comprise a boss 632. The boss 632 can have any desired shape. In the illustrated configuration, the boss 632 is a cylindrical protrusion from the surrounding rear surface 624.

The cylindrical body 604 may be similar in many aspects to the plug 142 described above. The illustrated cylindrical body 604, however, includes a cover receiving recess 634. The recess 634 extends rearward from a front face 636 of the cylindrical body 604. The recess 634 can have any suitable configuration. In the illustrated configuration, the recess 634 is cylindrical and has a larger inside diameter than an outside diameter of the boss 632.

A threaded bore 640 extends through an axis of the cylindrical body 604. The threaded bore 640 is sized and configured to receive a threaded shaft portion 642 of the fastener 614. The threaded shaft portion 642 receives a nut 644 that locks the fastener 614 into position relative to the cylindrical body 604. In some configurations, the nut 644 can be a nylock nut. In the illustrated configuration, red lock tite, welding, or another method of fastening can be used to secure the nut 644 in position relative to the fastener 614. With the nut 644 secured to the fastener 614, rotation of the head of the fastener 614 causes rotation of the cylindrical body 604. An outer circumferential surface 646 of the cylindrical body 604 includes threads 650 that mesh with threads of the swivel 602. Thus, rotation of the cylindrical body 604 threads the cylindrical body 604 into the swivel 602 until a stopping lip 652 contacts a front end 654 of the swivel 602. In the illustrated configuration, the stopping lip 652 extends radially outward from the cylindrical body 604. The cover 606 preferably extends rearward beyond the stopping lip 652 so that the cover 606 can reduce or eliminate the ability of an attacker being able to gain access to the stopping lip 652.

In the illustrated configuration, a shield 656 can be inserted into the recess 634 once the locking cap 600 can be installed into the swivel 602. The shield 656 reduces the likelihood of tampering and covers the head of the fastener 614. When the locking cap 600 is installed, the cylindrical body 604 is secured by friction loading (e.g., between the threads and between the stopping lip 652 and the end of the swivel 602). The cover 606 can rotate relative to the swivel 602 and the cylindrical body 604.

Figure 23:
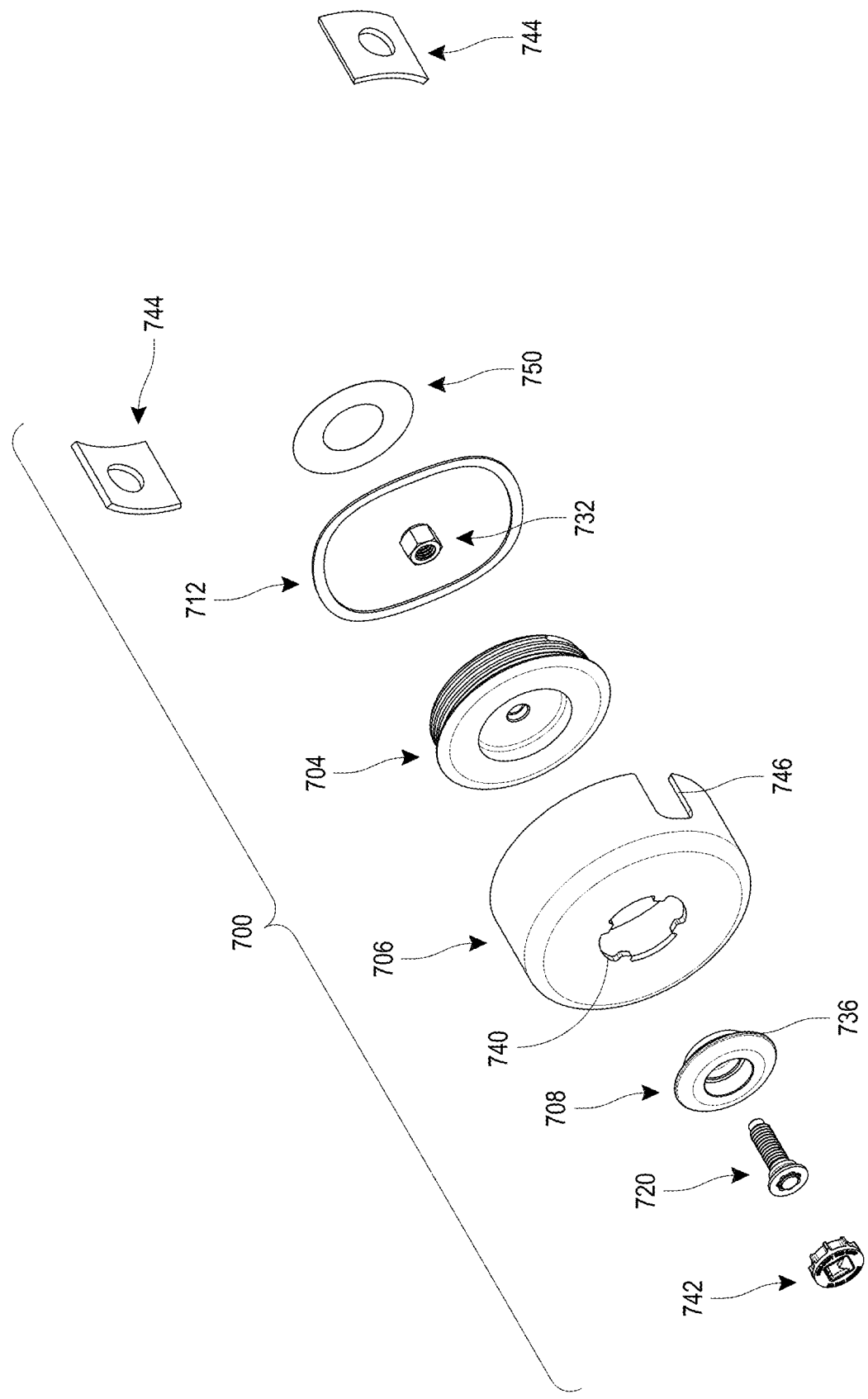
FIG. 23 is an exploded view of a ninth exemplary locking cap embodiment that is arranged and configured in accordance with certain features, aspects, and advantages of the present invention.
Figure 24:
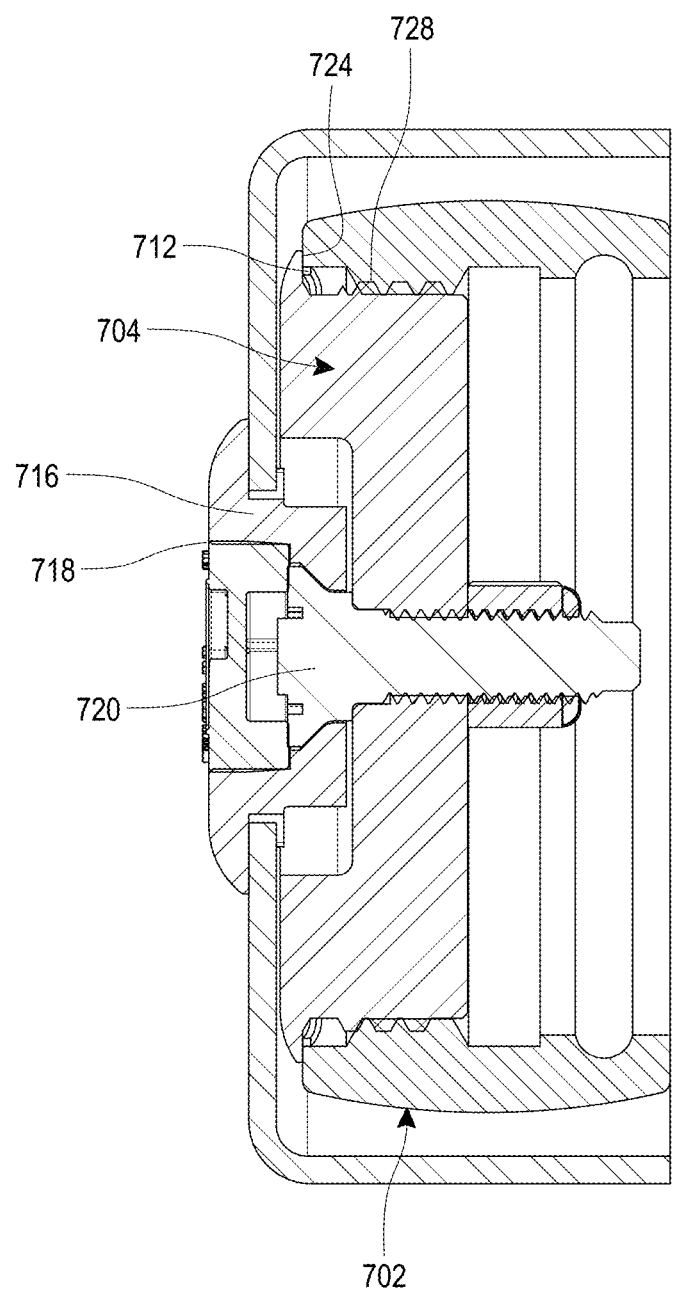
FIG. 24 is a sectioned side view of the locking cap of FIG. 23 in a locked configuration.

FIGS. 23 and 24 illustrate a swivel guard cap 700 that is arranged and configured in accordance with certain features, aspects, and advantages of certain embodiments of the present invention.

With reference to FIG. 23, the illustrated cap 700 primarily comprises a cylindrical body 704, a swivel guard 706, a cover 708, and a wave washer 712. As will be described below, the cap 700 can be sized and configured to insert into and lock within the swivel 702 of the fire department connection.

With reference to FIG. 24, the cover 708 may be similar in many ways to the cover 186. The cover 708 may have a recess 718. The recess 718 is preferably sized and configured to receive a fastener 720. The fastener 720 may be similar in many aspects to the fastener 164.

The cylindrical body 704 may be similar in many aspects to the cylindrical body 182. The illustrated cylindrical body 704, however, can be configured to retain a wave washer 712. The wave washer 712 can be retained between a lip 724 and a leading thread surface 728. The wave washer 712 can be sized and configured to be retained between the lip 724 and the leading thread surface 728. An interior diameter of the wave washer 712 may be smaller than the outer diameter of the lip 724. The interior diameter of the wave washer 712 may be smaller than the outer diameter of the leading thread surface 728. It may be advantageous to retain the wave washer 712 between the lip 724 and the leading thread surface 728 to prevent the wave washer from becoming lost or misplaced with the cap is not installed on the swivel 702. The wave washer 712 may be split. The split in the waver washer 712 may be advantageous for assembling the swivel guard cap 700.

The wave washer 712 may have an outer diameter that is larger than the inner diameter of opening of the swivel 702. The wave washer 712 may have an outer diameter that is smaller than the outer diameter of the cylindrical body 704. It may be advantageous to have the wave washer 712 outer diameter less than the outer diameter of the cylindrical body 704 to protect the wave washer 712 from attack. The wave washer can be made of steel. In some cases, the wave washer can be made of 17-4 Stainless Steel.

The swivel guard 706 may be similar in many aspects to the swivel guard 184. The swivel guard 706 preferably is sized and configured to cover the swivel 702 when the cap 700 is installed to the swivel 702.

The cylindrical body 704 may be assembled with the swivel guard 706 and the cover 708 by a fastener 720 extending through the cover 708 and the body 704. A nut 732, or other locking mechanism or technique, can be used to hold the assembly together. In the illustrated configuration, red loctite, welding, or another method of fastening can be used to secure the nut 732 in position relative to the fastener 720. As described above, the fastener 720 is threaded into an opening in the body 704 and the nut 732 helps prevent relative rotation between the fastener 720 and the body 704. In some embodiments, red Loctite can be used to secure the fastener 720 to the body 704.

The swivel guard 706 is retained by the cover 708 between the cover 708 and the body 704. In some configurations, the cover 708 can be configured to abut closely with the swivel guard 706 such that a flat tool, such as a screwdriver, cannot be easily inserted between the swivel guard 706 and the cover 708. Desirably, the swivel guard 706 can rotate relative to the body 704. In some configurations, the cover 708 and the swivel guard 706 both may spin relatively freely relative to the body 704. In some embodiments, as shown in FIG. 23, the cover 708 may have locking features 736, and the swivel guard 706 can have corresponding locking features 740. The locking features 736 and the locking features 740 can, once assembled, prevent significant relative motion (e.g., prevent rotation yet may allow some play) between the swivel guard 706 and the cover 708. In some embodiments, the opening in the center of the illustrated swivel guard 706 incorporates teeth that are received within recess formed in the outer periphery of the cover 708. This restricts motion of the cover 708 relative to the swivel guard 706. This may allow the swivel guard 706 and cover 708 to stay stationary and reduce the likelihood of attacks that may rotate the threaded body 704.

In some embodiments, a decal 750 can be assembled to the body 704. The decal 750 can advantageously be labeled with information describing the cap 700.

Lug guards 744 can be assembled to the swivel 702 before the body 704 and swivel guard 706 are installed. The lug guards 744 can provide additional protection to the swivel. The lug guards 744 may be particularly useful in thwarting drill attacks.

To install and lock the cap 700, the assembly is inserted into the swivel 702 such that notches 746 receive lugs of the swivel 702. To tighten the cap 700 into place, the body 704 is rotated relative to the swivel 702 and threaded into the swivel 702. Once the cylindrical body 704 has been threaded into the swivel 702, the final tightening may, in some embodiments, be completed with a specialized tool inserted into the fastener 720 as discussed above. When the cap 700 is tightened against the swivel 702, the cylindrical body 704 exerts a force on the wave washer 712. The wave washer 712 is compressed between the cylindrical body 704 and the swivel 702. After tightening, the wave washer 712 applies a force tending to push the cylindrical body 704 and the swivel 702 apart. This force increases the frictional load resisting rotation of the body 704 relative to the swivel 702. The reverse process can be used to remove the cap 700 from the swivel 702. In some embodiments, the torque for assembly can be 7.0-8.1 ft-lbs. In some embodiments, the wave washer 712 can have a preload of 56-96 lbs. The wave washer 712 can be made of steel. In some embodiments, the wave washer 712 is composed of 17-4 Stainless Steel. In the assembled state the swivel guard 706 and cover 708 can rotate relative to the cylindrical body. In some embodiments, a plug 742 can be assembled in a position over the fastener 720. The plug 742 can be advantageous to protect the fastener from the elements.

The inclusion of the wave washer 712 may be advantageous to increase the torque required to remove the cap 700. The inclusion of the wave washer 712 may be advantageous to absorb shock and impact when an impact is delivered to the lugs of the swivel 702.

In some embodiments the cylindrical body 704, fastener 720, and nut 732 are permanently attached by welding. Loctite, or another method. In some embodiments the cylindrical body 704, fastener 720, and nut 732 are unitary.

Figure 25:
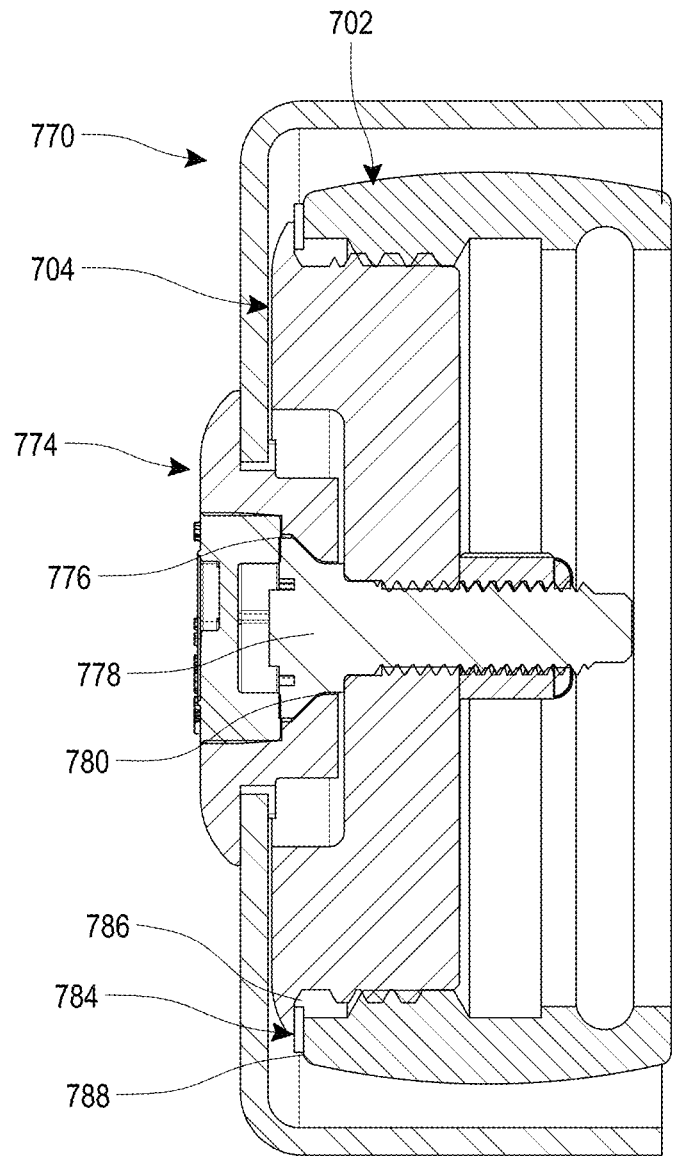
FIG. 25 is a sectioned side view of another embodiment of the locking cap of FIG. 23.

FIG. 25 illustrates a locking cap 770. The locking cap 770 may be similar in many aspects to the locking cap 700. The locking cap 770 can include a cover 774 and a wave washer 776. The cover 774 may be similar in many aspects to the cover 708. The cover 774 can include one or more stepped recesses 778. The one or more stepped recesses 778 may be sized and configured to receive a fastener 780. The one or more stepped recesses 778 may be a stepped or plain bore. The fastener 780 may be similar in many aspects to the fastener 720. The fastener 780 can have one or more stepped portions 782 configured to fit inside the one or more stepped recessed 778. The one or more stepped portions 780 may be a stepped or plain counterbore.

The wave washer 776 may be similar in many aspects to the wave washer 712. The wave washer 776 can be sized such that the outer diameter 786 of the wave washer 776 is larger than the outer diameter of the cylindrical body 704. The wave washer 776 can be sized and configured such that the inner diameter 788 of the wave washer 784 is smaller than the inner diameter of the opening end of the swivel 702.

Figure 26:
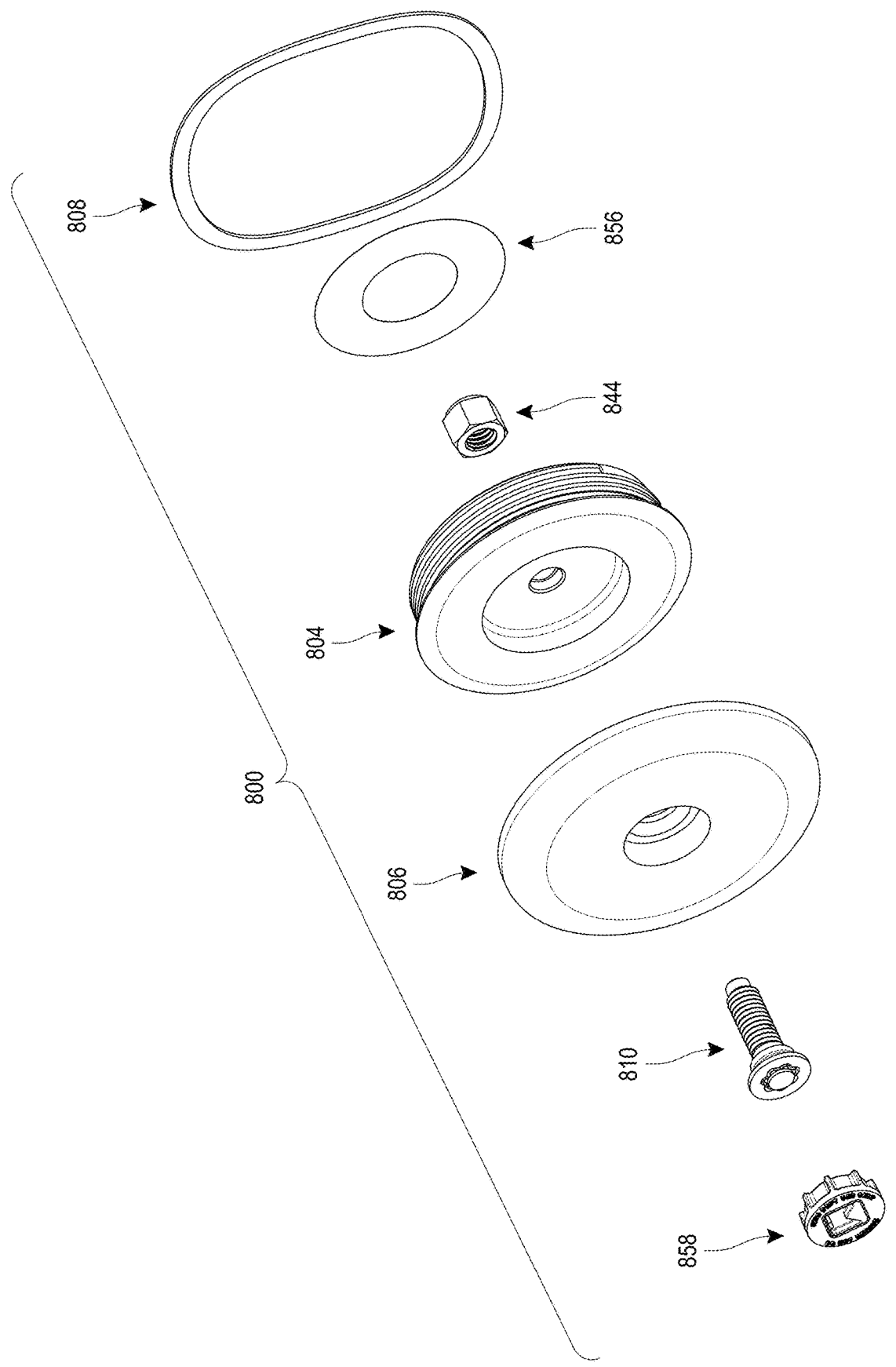
FIG. 26 is an exploded view of a tenth exemplary locking cap embodiment that is arranged and configured in accordance with certain features, aspects, and advantages of the present invention.
Figure 27:
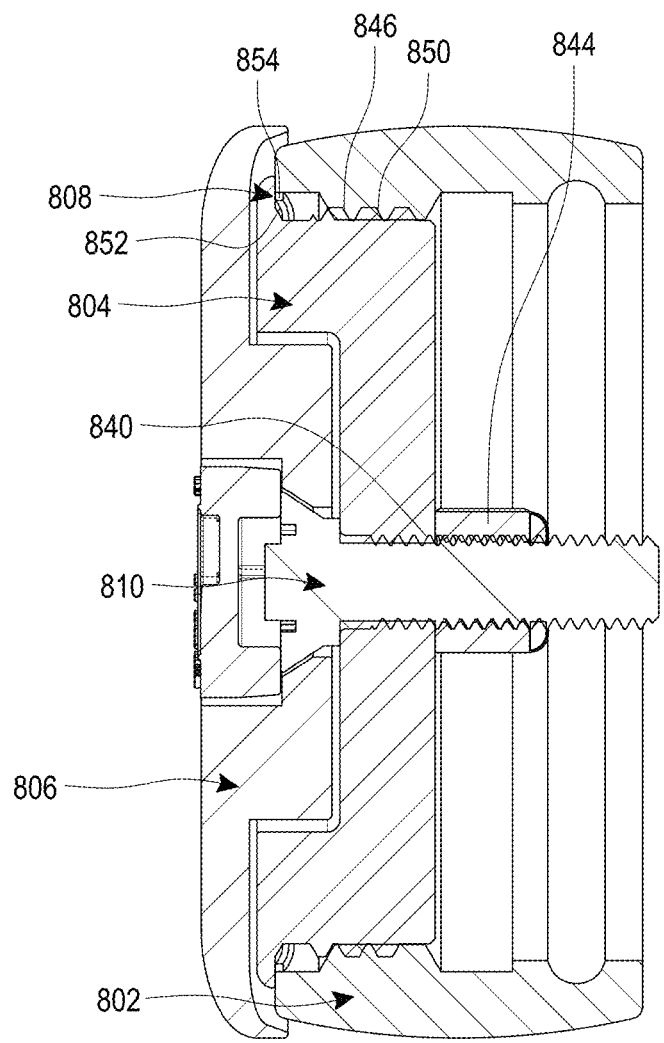
FIG. 27 is a sectioned side view of the locking cap of FIG. 26 in a locked configuration.

FIGS. 26-27 illustrate a locking cap 800 that is arranged and configured in accordance with certain features, aspects, and advantages of certain embodiments of the present invention. The locking cap is illustrated in FIG. 27 installed into a swivel 802.

With reference to FIG. 26, the illustrated cap 800 primarily comprises a cylindrical body 804, a cover 806 and a wave washer 808. As will be described below the cap 800 can be sized and configured to insert into the swivel 802 of the fire department connection. In some configurations, the cap 800 can be sized and configured to be threaded into the swivel 802 of the fire department connection.

The cover 806 may be similar in many aspects to the cover 606. The fastener 810 may be similar in many aspects to the fastener 164 described above. The wave washer 808 may be similar in many aspects to the wave washer 712 described above. The cylindrical body 804 may be similar in many aspects to the plug 604 described above.

The cover 806 extends radially outward further than the cylindrical body 804. A threaded bore 840 extends through an axis of the cylindrical body 804. The threaded bore 840 is sized and configured to receive the fastener 810. The fastener receives a nut 844 that helps to lock the fastener 810 into position relative to the cylindrical body 804. In some configurations, the nut 844 can be a nylock nut. In the illustrated configuration, red loctite, welding, or another method of fastening can be used to secure the nut 844 in position relative to the fastener 810. In some embodiments, red lock tite, welding, or another method of fastening can be used to secure the cylindrical body 804 relative to the fastener 810. With the nut 844 secured to the fastener 810, rotation of the head of the fastener 810 causes rotation of the cylindrical body 804. An outer circumferential surface 846 of the cylindrical body 804 includes threads 850 that mesh with threads of the swivel 802. Thus, rotation of the cylindrical body 804 threads the cylindrical body 804 into the swivel 802 until the wave washer 808 becomes compressed between a stopping lip 852 and a front end 854 of the swivel 802. The reverse process can be used to remove the cap 800 from the swivel 802.

After tightening, the wave washer 808 applies a force tending to push the cylindrical body 804 and the swivel 802 apart. This force increases the frictional load resisting rotation of the body 804 relative to the swivel 802. In some embodiments, the torque for assembly can be 7.0-8.1 ft-lbs. In some embodiments, the wave washer 808 can have a preload of 56-96 lbs. The wave washer 808 can be made of steel. In some embodiments, the wave washer 808 is composed of 17-4 Stainless Steel.

In the illustrated configuration, the stopping lip 852 extends radially outward from the cylindrical body 804. The cover 806 preferably extends rearward beyond the stopping lip 852 so that the cover 806 can reduce or eliminate the ability of an attacker being able to gain access to the stopping lip 852. When the locking cap 800 is installed, the cylindrical body 804 is secured by friction loading (e.g., between the threads and between the stopping lip 852, the end of the swivel 802, and the wave washer 808). The cover 806 can rotate relative to the swivel 802 and the cylindrical body 804. In some embodiments, a decal 856 can be assembled to the body 804. The decal 856 can advantageously be labeled with information describing the cap 800. In some embodiments, a plug 858 can be assembled in a position over the fastener 810.

In some embodiments the cylindrical body 804, fastener 810, and nut 844 are permanently attached by welding, Loctite, or another method. In some embodiments the cylindrical body 804, fastener 810, and nut 844 are unitary.

Figure 28:
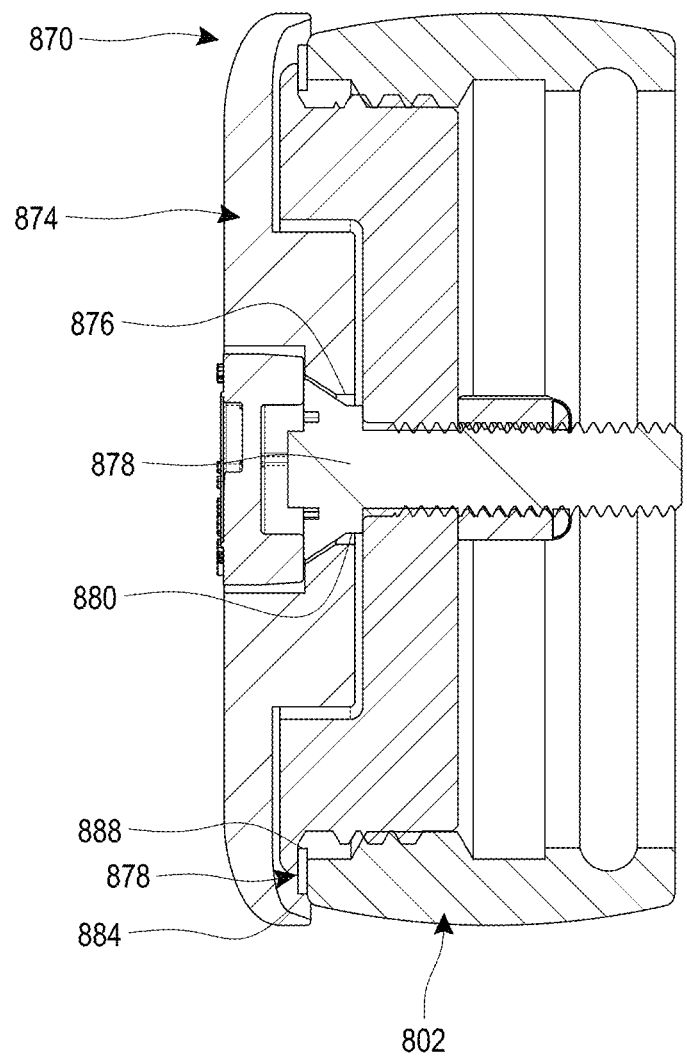
FIG. 28 is a sectioned side view of another embodiment of the locking cap of FIG. 26.

FIG. 28 illustrates a locking cap 870. The locking cap 870 may be similar in many aspects to the locking cap 800. The locking cap 870 can include a cover 874 and a wave washer 878. The cover 874 may be similar in many aspects to the cover 806. The cover 874 can include one or more stepped recesses 876. The one or more stepped recesses 876 may be sized and configured to receive a fastener 810. The one or more stepped recesses 876 may be a stepped or plain bore. The fastener 810 may be similar in many aspects to the fastener 810. The fastener 810 can have one or more stepped portions 880 configured to fit inside the one or more stepped recesses 876. The one or more stepped portions 880 may be a stepped or plain counterbore.

In some embodiments, the wave washer 878 may be similar in many aspects to the wave washer 808. The wave washer 878 can be sized such that the outer diameter 884 of the wave washer 878 is larger than the outer diameter of the cylindrical body 804. The wave washer 878 can be sized and configured such that the inner diameter 888 of the wave washer 878 is smaller than the inner diameter of the opening end of the swivel 802.

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z." unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that may be described in this disclosure in the context of separate implementations can also be implemented in combination in a single implementation. Conversely, various features that may be described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about." "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be to be construed in an inclusive sense as opposed to an exclusive or exhaustive sense, that may be to say, in the sense of "including, but not limited to".

Reference to any prior art in this description may be not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference may have been made to integers or components may have known equivalents thereof, those integers may be herein incorporated as if individually set forth. In addition, where the term "substantially" or any of it's variants have been used as a word of approximation adjacent to a numerical value or range, it may be intended to provide sufficient flexibility in the adjacent numerical value or range that encompasses standard manufacturing tolerances and/or rounding to the next significant figure, whichever may be greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It may be therefore intended that such changes and modifications be included within the scope of the invention. Moreover, not all of the features, aspects and advantages may be necessarily required to practice the present invention. Accordingly, the scope of the present invention may be intended to be defined only by the claims.

What is claimed is:

1. A locking cap for a pipe end, the locking cap comprising:
    a first portion comprising a front cover having a front surface and a rear surface;
    a second portion axially movable relative to the first portion, the second portion comprising a plug portion comprising a front surface, a rear surface, and a central region extending between the front surface and the rear surface, the plug portion sized and configured to be received by the pipe end with a side surface of the central region of the plug portion having a surface area generally coextensive with an inner contact surface of the pipe end, wherein the second portion further comprises a threaded region disposed on the central region configured to mate with the pipe end; and
    a tool receiver accessible through the front surface of the plug portion, wherein when the locking cap is in a locked position a gap between a nut and the plug portion is increased compared to when the locking cap is in an unlocked position, wherein the nut is attached to a fastener that fastens the front cover to the plug portion, and wherein the fastener increases an axial load between threads of the plug portion and threads of a swivel portion of the pipe end resisting rotation of the plug portion relative to the swivel portion when in the locked position.

2. The locking cap of claim 1, wherein the front cover comprises a planar front surface.

3. The locking cap of claim 1, wherein axial movement of the first portion relative to the second portion modifies a friction load between the locking cap and a swivel portion of the pipe end.

4. The locking cap of claim 1, further comprising a swivel guard comprising two notches configured to accommodate lugs of the pipe end and rotatably fastened to the front surface of the plug portion.

5. The locking cap of claim 1, wherein the tool receiver is disposed on a head of a bolt that extends from the front surface of the front cover to at least the rear surface or the plug portion.

6. The locking cap of claim 1, wherein the tool receiver is recessed into the front surface of the front cover.

7. The locking cap of claim 1, wherein the front cover further comprises a cylindrical structure that extends rearward from the rear surface of the front cover.

8. The locking cap of claim 7, wherein the cylindrical structure comprises a tiered cylindrical structure with a diameter of a first tier of the cylindrical structure extending rearward from the rear surface of the front cover being larger than a diameter of a second tier of the cylindrical structure extending rearward from the first tier of the cylindrical structure.

9. The locking cap of claim 7, wherein the cylindrical structure comprises a pocket configured to receive a pin that secures the front cover to the plug portion.

10. The locking cap of claim 9, wherein the cylindrical structure comprises three pockets, each pocket configured to receive a corresponding pin that secures the front cover to the plug portion.

11. The locking cap of claim 9, wherein the plug portion comprises a corresponding pocket that is configured to align with the pocket of the cylindrical structure.

12. The locking cap of claim 7, wherein the plug portion comprises a cylindrical indentation configured to receive the cylindrical structure of the front cover.

13. The locking cap of claim 1, wherein the plug portion comprises a threaded opening configured to receive a bolt.

14. The locking cap of claim 1, wherein an outer diameter of the front cover is smaller than an outer diameter of a swivel portion of the pipe end and larger than an inner diameter of the swivel portion of the pipe end.

15. The locking cap of claim 1, wherein the plug portion comprises a threaded portion on an outer surface that is configured to mate with threads of a swivel portion of the pipe end.

16. The locking cap of claim 1, wherein the front cover is secured to the plug portion enabling the front cover and the plug portion to rotate together.

17. The locking cap of claim 1, wherein when the locking cap is in an unlocked position, the front cover and the plug portion are configured to rotate together.

18. The locking cap of claim 1, wherein when the locking cap is in an unlocked position, a gap between the front cover and the plug portion is larger than when the locking cap is in a locked position.

19. The locking cap of claim 1, wherein the tool receiver comprises a channel that accepts a driver tool.

* * * * *